(12) United States Patent
Sanjo et al.

(10) Patent No.: US 8,786,957 B2
(45) Date of Patent: Jul. 22, 2014

(54) ZOOM LENS AND IMAGE PICKUP APPARATUS INCLUDING THE SAME

(75) Inventors: Yotaro Sanjo, Utsunomiya (JP); Shinichiro Yakita, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 95 days.

(21) Appl. No.: 13/531,695

(22) Filed: Jun. 25, 2012

(65) Prior Publication Data

US 2013/0003189 A1    Jan. 3, 2013

(30) Foreign Application Priority Data

Jul. 1, 2011    (JP) ................. 2011-147073

(51) Int. Cl.
*G02B 15/14*    (2006.01)
(52) U.S. Cl.
CPC ..................... *G02B 15/14* (2013.01)
USPC ........... 359/684; 359/676; 359/686; 359/687; 359/689; 359/690

(58) Field of Classification Search
CPC .......... G03G 9/08755; G03G 15/0818; G03G 9/0804; G03G 9/0815; G03G 9/087; G03G 15/0131; G03G 15/08; G03G 15/0875; G03G 15/0877; G03G 2215/0132; G03G 9/08; G03G 9/0819; G03G 9/0821; G03G 9/0827; G03G 9/08782; G03G 9/08797; G03G 15/00; G03G 15/01; G03G 15/0178; G03G 15/0189; G03G 15/02; G03G 15/0233; G03G 15/043; G03G 15/0806; G03G 15/0808; G03G 15/0812; G03G 15/0834; G03G 15/0898; G03G 15/16; G03G 21/1814; G03G 21/1817; G03G 2215/0161; G03G 2215/0164; G03G 5/056; G03G 5/0564; G03G 5/0578; G03G 5/0614; G03G 5/14708; G03G 5/14752; G03G 5/14756; G03G 5/14773; G03G 7/0053; G03G 9/00; G03G 9/0812; G03G 9/0817; G03G 9/0832; G03G 9/08704; G03G 9/08764; G03G 9/08788; G03G 9/0906; G03G 9/09708; G03G 9/09716; G03G 9/09733; G03G 9/09783; G03G 9/1075; G03G 9/1131; A61K 49/0093; A61K 49/225; A61K 49/0032; A61K 49/0034; A61K 49/0036; A61K 49/0041; A61K 49/0052; A61K 49/006; A61K 49/0084; A61K 49/22; A61K 49/222; A61K 49/226; A61K 9/5153; H01L 41/1871; H01L 41/09; H01L 51/0056; H01L 51/5012; H01L 27/153; H01L 27/3244; H01L 33/0045; H01L 41/0973; H01L 41/1878; H01L 41/43; H01L 51/0054; H01L 51/0058; H01L 51/0059; H01L 51/006; H01L 51/0067; H01L 51/0072; H01L 51/0094; H01L 51/5028; H01L 51/5256; C03C 11/005; C03C 15/00; C03C 17/25; C03C 2217/425; C03C 17/006; C03C 17/02; C03C 17/42; C03C 21/002; C03C 21/005; C03C 2217/228; C03C 2217/23; C03C 2217/73; C03C 2217/77; G01B 9/02091; G01B 11/2441; G01B 2290/60; G01B 9/0203; G01B 9/02032; G01B 9/02076; G01B 9/02082; G01B 9/02083; G02F 1/0126; G02F 1/33502; G02F 1/3511; G02F 1/3515; G02F 1/3517; G02F 1/365; G02F 2203/01
USPC .............. 359/197.1, 365, 366, 557, 576, 601, 359/648, 674, 683, 684, 687, 690, 731, 755, 359/883; 351/206, 246; 347/20, 33, 56, 86, 347/100

See application file for complete search history.

(56) References Cited

U.S. PATENT DOCUMENTS

| | | | |
|---|---|---|---|
| 7,304,805 B2* | 12/2007 | Endo et al. | 359/690 |
| 8,477,429 B2* | 7/2013 | Hori et al. | 359/688 |
| 2006/0285224 A1 | 12/2006 | Endo et al. | |
| 2010/0182705 A1 | 7/2010 | Hori et al. | |

FOREIGN PATENT DOCUMENTS

| | | |
|---|---|---|
| CN | 101276048 A | 10/2008 |
| CN | 100576011 C | 12/2009 |
| JP | 8297244 A | 11/1996 |
| JP | 3513264 B2 | 1/2004 |
| JP | 3513264 B2 | 3/2004 |
| JP | 2006-349947 A | 12/2006 |
| JP | 2009-037036 A | 2/2009 |

OTHER PUBLICATIONS

Schott, "Tie-19: Temperature Coefficient of Refractive Index", Technical Information: Advanced Optics, Jul. 2008, pp. 4-6.*

Extended European Search Report issued Oct. 30, 2012 for corresponding EP 12004774.

Chinese Office Action for corresponding CN 201210229026.4, dated Apr. 8, 2014. English translation provided.

* cited by examiner

*Primary Examiner* — Joseph P Martinez
*Assistant Examiner* — Collin X Beatty
(74) *Attorney, Agent, or Firm* — Rossi, Kimms & McDowell LLP

(57) ABSTRACT

A zoom lens includes, in order from an object side, a positive first lens unit which does not move for zooming, a negative second lens unit which moves in an optical axis direction for zooming, a negative third lens unit which moves in the optical axis direction for zooming so as to correct image plane variation due to zooming, and a positive fourth lens unit which does not move for zooming. The fourth lens unit includes, in an order from the object side, a positive first sub lens unit and a positive second sub lens unit, which are separated by a largest air interval in the fourth lens unit. Abbe constants, partial dispersion ratios, and coefficients of the refractive index variation due to the temperature variation are appropriately set for lens materials forming the third lens unit, the first sub lens unit, and the second sub lens unit.

8 Claims, 10 Drawing Sheets

ZOOM LENS AND IMAGE PICKUP APPARATUS INCLUDING THE SAME

BACKGROUND OF THE INVENTION

1. Field of the Invention

The present invention relates to a zoom lens which is suitable for use in a broadcasting television camera, a video camera, a digital still camera, and a silver-halide film camera, and to an image pickup apparatus including the zoom lens.

2. Description of the Related Art

In recent years, there has been demanded a zoom lens having a high aperture ratio, a high zoom ratio, and high optical performance for an image pickup apparatus such as a broadcasting television camera, a silver-halide film camera, a digital still camera, and a video camera.

Positive-lead, telephoto type four-unit zoom lenses in which four lens units are provided in total and one of the lens units located closest to an object side has positive refractive power have been known as zoom lenses having a high zoom ratio.

For instance, there has been known a four-unit zoom lens including a first lens unit having positive refractive power for focusing, a second lens unit having negative refractive power for varying magnification, a third lens unit having negative refractive power for correcting image plane variation, and a fourth lens unit having positive refractive power for imaging.

In general, in order to achieve a higher zoom ratio, if a focal length at a telephoto end is set longer, an axial chromatic aberration among various aberrations at a telephoto side increases. If a focal length at a wide-angle end is set shorter, a lateral chromatic aberration among various aberrations at a wide-angle side increases. It is important to appropriately correct the chromatic aberration not only in a first-order spectrum but also in a second-order spectrum for obtaining high-quality image performance.

As a method of reducing such occurrence of the chromatic aberration, an achromatization method using an optical material having extraordinary dispersion and an achromatization method using a diffraction grating have been known well in general (see Japanese Patent Application Laid-Open No. 2006-349947).

In addition, there has been a demand for change in optical performance, in particular smaller focus change, even if ambient temperature varies.

There has been known a technology capable of easily changing a magnification-varying range in a zoom lens for a television camera by adopting a structure in which a magnification conversion optical system can be inserted into and removed from a predetermined interval in the zoom lens. Japanese Patent No. 3,513,264 proposes a zoom lens in which defocus due to temperature variation is suppressed while reducing the second-order spectrum of the axial chromatic aberration even when the magnification conversion optical system is inserted.

A positive-lead type four-unit zoom lens having a structure described above may obtain a high zoom ratio relatively easily. In order to obtain high optical performance in this four-unit zoom lens, it is important to correct the lateral chromatic aberration at the wide-angle end and the axial chromatic aberration at the telephoto end appropriately. It is easy to appropriately correct the lateral chromatic aberration and the axial chromatic aberration if an optical material having extraordinary dispersion is used.

However, in general, an organic material such as a resin and plastic having extraordinary dispersion has a large value dn/dT of refractive index variation due to temperature variation, which is approximately 10 to 200 times larger than that of glass. Therefore, when an optical element made of an organic material having strong refractive power is used in order to obtain a chromatic aberration correction effect, it is important to reduce defocus (image plane shift) in an optical system due to ambient temperature variation. In order to reduce the defocus in an optical system due to ambient temperature variation, it is necessary to maintain a small back focus variation amount due to ambient temperature variation.

SUMMARY OF THE INVENTION

The present invention provides a zoom lens, which is capable of appropriately correcting a chromatic aberration over an entire zoom range from a wide-angle end to a telephoto end, and has a high zoom ratio, high optical performance over the entire zoom range, and less focus change even if an ambient temperature varies, and to provide an image pickup apparatus including the zoom lens.

In order to achieve the above-mentioned object, according to an exemplary embodiment of the present invention, there is provided a zoom lens, including, in an order from an object side: a first lens unit having positive refractive power which does not move for varying magnification; a second lens unit having negative refractive power which moves in an optical axis direction during varying magnification; a third lens unit which moves in the optical axis direction during varying magnification; and a fourth lens unit having positive refractive power which does not move for varying magnification, in which: the fourth lens unit includes, in an order from the object side, a first sub lens unit having positive refractive power, and a second sub lens unit having positive refractive power; the first sub lens unit and the second sub lens unit are separated by a largest air interval in the fourth lens unit; the second sub lens unit includes at least one refracting optical element having positive refractive power; the following conditions are satisfied:

$$-2.100\times10^{-3}\times vdm+0.693<\theta gFm; \text{ and}$$

$$0.555<\theta gFm<0.900,$$

where "$\theta gFm$" and "$vdm$" represent a partial dispersion ratio and an Abbe constant of the refracting optical element, respectively, provided that:

$$vdm=(Nd-1)/(NF-NC); \text{ and}$$

$$\theta gFm=(Ng-NF)/(NF-NC),$$

where "Ng", "NF", "Nd", and "NC" represent refractive indices for a g-line, an F-line, a d-line, and a C-line, respectively; and the third lens unit, the first sub lens unit, and the second sub lens unit each satisfy the following conditions for lenses except the refracting optical element having positive refractive power included in the second sub lens unit:

$$1.5\times10^{-5}<\Sigma_{i,j}(\phi p_{ij}\times(dn/dT)p_{ij})/\Sigma^i\phi_i<3.0\times10^{-5} \ (i=3, 4a, 4b) \ (j=1, 2, \ldots, Sp_i); \text{ and}$$

$$-4.0\times10^{-5}<\Sigma_{i,j}(\phi n_{ij}\times(dn/dT)n_{ij})/\Sigma^i\phi_i<-2.5\times10^{-5} \ (i=3, 4a, 4b) \ (j=1, 2, \ldots, Sn_i),$$

where "$\phi p_{ij}$" represents refractive power of a j-th lens having positive refractive power from the object side in an i-th lens unit, "$\phi n_{ij}$" represents refractive power of a j-th lens having negative refractive power from the object side in the i-th lens unit, "$\phi_i$" represents refractive power of the i-th lens unit, "$(dn/dT)p_{ij}$" represents a coefficient of refractive index variation due to temperature variation (an average value in a range of $-20°$ C. to $40°$ C.) in air on an e-line of the j-th lens having positive refractive power other than the refracting optical element among lenses having positive refractive power from the object side in the i-th lens unit, "(dn/dT)$n_{ij}$" represents a coefficient of refractive index variation due to temperature variation (an average value in a range of −20° C. to 40° C.) in the air on the e-line of the j-th lens having negative refractive power from the object side in the i-th lens unit, "$Sp_i$" represents a number of lenses having positive refractive power in the i-th lens unit other than the refracting optical element, and "$Sn_i$" represents a number of lenses having negative refractive power in the i-th lens unit.

According to the present invention, it is possible to provide the zoom lens having high optical performance over the entire zoom range and less variation of optical performance even if the ambient temperature varies, and to provide the image pickup apparatus including the zoom lens.

Further features of the present invention will become apparent from the following description of exemplary embodiments with reference to the attached drawings.

DESCRIPTION OF THE EMBODIMENTS

Figure 1:
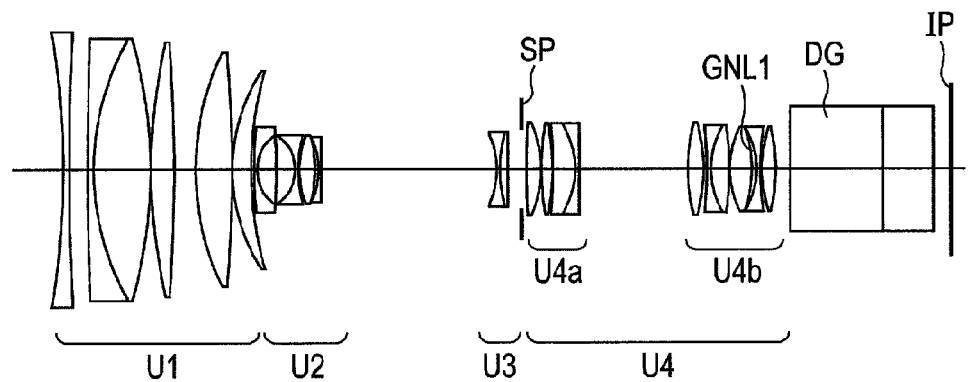
FIG. 1 is a cross-sectional view of a zoom lens at a wide-angle end in focus at infinity according to a first embodiment of the present invention.

First, features of a lens structure of each embodiment are described.

A zoom lens according to the present invention includes, in an order from an object side to an image side, a first lens unit U1 having positive refractive power which does not move for zooming, and a second lens unit U2 having negative refractive power which moves toward the image side for zooming from a wide-angle end (short focal length end) to a telephoto end (long focal length end).

Further, the zoom lens includes a third lens unit U3 having negative refractive power which moves on an optical axis together with movement of the second lens unit U2 so as to correct image plane variation due to magnification-varying, and a fourth lens unit U4 having positive refractive power for imaging which does not move for zooming.

The fourth lens unit U4 includes a first sub lens unit U4a having positive refractive power and a second sub lens unit U4b having positive refractive power on respective sides of an air interval having the largest distance.

Further, the fourth lens unit U4 includes a varying-magnification optical system EXT that can be inserted into and removed from an optical path between the first sub lens unit U4a and the second sub lens unit U4b, for changing a focal length range of the entire lens system.

Next, conditional expressions in the present invention are described.

An axial chromatic aberration and a lateral chromatic aberration on an F-line with respect to a C-line are defined as a first-order spectrum of the axial chromatic aberration and a first-order spectrum of the lateral chromatic aberration, respectively. In addition, an axial chromatic aberration and a lateral chromatic aberration on a g-line with respect to the F-line remaining after correcting the first-order spectrum to zero are defined as a second-order spectrum of the axial chromatic aberration and a second-order spectrum of the lateral chromatic aberration, respectively.

An axial chromatic aberration coefficient L and a lateral chromatic aberration coefficient T of the entire lens system are given by the following expressions (1) and (2).

$$L = \Sigma(h\_i \times h\_i \times \phi\_i / \nu\_i) \quad (1)$$

$$T = \Sigma(h\_i \times h\_\text{bar}\_i \times \phi\_i / \nu\_i) \quad (2)$$

where "h_i" represents a height of an axial ray from the optical axis of an i-th thin lens in paraxial ray tracing, "h_bar_i" represents a height of an off-axial ray from the optical axis of the i-th thin lens in the paraxial ray tracing, "φ_i" represents refractive power of the i-th thin lens in the paraxial ray tracing, and "ν_i" represents an Abbe constant of the i-th thin lens in the paraxial ray tracing. In the following description, the ordinal number indicates an order of arrangement in the lens from the object side unless otherwise noted.

Further, an axial chromatic aberration amount Δf and a lateral chromatic aberration amount ΔY of the entire lens system are given by the following expressions (3) and (4).

$$\Delta f = -f \times L \quad (3)$$

$$\Delta Y = -Y \times T \quad (4)$$

where "f" represents a focal length of the entire lens system, and "Y" represents an image height.

Figure 10:
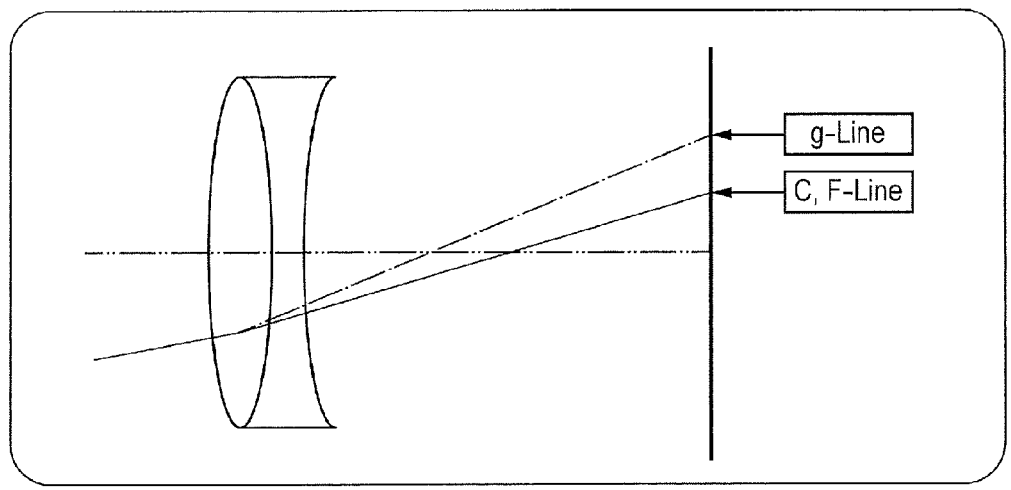
FIG. 10 is a schematic diagram illustrating a principle of correcting a lateral chromatic aberration in the zoom lens according to the present invention.

Here, partial dispersion of the Abbe constant v_i used in the expressions (1) and (2) is assumed to be "Ng−NF", where Ng represents refractive index for g-line (435.8 nm) and NF represents refractive index for F-line (486.1 nm). Then, the expressions (1) and (2) express chromatic aberration coefficients of second-order spectra of the axial chromatic aberration and the lateral chromatic aberration, respectively, and the expressions (3) and (4) express second-order spectrum amounts of the axial chromatic aberration and the lateral chromatic aberration, respectively. As understood from the expressions (1) and (3), an allotment value of the second-order spectrum of the axial chromatic aberration for each lens increases in proportion to the square of the height of the axial ray, the refractive power of the lens, and a refractive index difference between the g-line and the F-line. As understood from the expressions (2) and (4), an allotment value of the second-order spectrum of the lateral chromatic aberration for each lens increases in proportion to the height of the axial ray, the height of the off-axial ray, the lens refractive power, and the refractive index difference between the g-line and the F-line. Further, as understood from the expressions (1) and (2), a ratio between an allotment value of the axial chromatic aberration coefficient on the g-line with respect to the F-line for each lens and an allotment value of the lateral chromatic aberration coefficient on the g-line with respect to the F-line for each lens is determined by a ratio between the height of the axial ray and the height of the off-axial ray. In the conventional zoom lens, if the first-order spectrum of the lateral chromatic aberration at the wide-angle end is set to be zero as illustrated in FIG. 10, the second-order spectrum of the lateral chromatic aberration tends to remain positive.

In order to correct this, it is only necessary to arrange a lens made of a material having a large absolute value of the refractive index difference between the g-line and the F-line so as to have appropriate refractive power, and insert this lens at a position at which a large product of heights of the axial ray and the off-axial ray as well as an appropriate ratio of heights between the axial ray and the off-axial ray are obtained. Thus, it is possible to keep an appropriate balance of the correction of the second-order spectrum between the axial chromatic aberration and the lateral chromatic aberration at the wide-angle end, so as to achieve both appropriate correction of the second-order spectrum of the axial chromatic aberration over the entire zoom range and appropriate correction of the second-order spectrum of the lateral chromatic aberration at the wide-angle end.

Hereinafter, there is described a condition to achieve both the appropriate correction of the second-order spectrum of the axial chromatic aberration over the entire zoom range and the appropriate correction of the second-order spectrum of the lateral chromatic aberration at the wide-angle end.

In the zoom lens according to the present invention, at least one refracting optical element GNL having positive refractive power is disposed in the second sub lens unit U4b. This is because the second sub lens unit U4b has a large product of heights of the axial ray and the off-axial ray, and a ratio of the height of the off-axial ray to the height of the axial ray is large. It is more preferred to dispose the refracting optical element GNL at a position in the second sub lens unit U4b satisfying the following conditional expression (5). The conditional expression (5) defines a ratio of a height h_bar_m of the off-axial ray passing through the lens GNL from the optical axis to a height h_m of the axial ray passing through the lens GNL from the optical axis.

$$0.05 < h\_bar\_m/h\_m < 1.5 \quad (5)$$

Thus, it is possible to achieve both the appropriate correction of the second-order spectrum of the axial chromatic aberration over the entire zoom range and the appropriate correction of the second-order spectrum of the lateral chromatic aberration at the wide-angle end.

If the value falls out of the range of the conditional expression (5), it becomes difficult to keep a balance of the second-order spectrum between the axial chromatic aberration and the lateral chromatic aberration at the wide-angle end, in particular.

It is more preferred to set the numerical range of the conditional expression (5) to be as the following conditional expression (5a).

$$0.1 < h\_bar\_m/h\_m < 0.5 \quad (5a)$$

It is preferred to satisfy the following conditional expressions (6) and (7). The expressions (6) and (7) define a relationship between a partial dispersion ratio θgFm and an Abbe constant vdm of the refracting optical element GNL.

$$-2.100 \times 10^{-3} \nu \times dm + 0.693 < \theta gFm \quad (6)$$

$$0.555 < \theta gFm < 0.900 \quad (7)$$

The Abbe constant vdm and the partial dispersion ratio θgFm regarding the g-line and the F-line are as follows.

$$\nu dm = (Nd-1)/(NF-NC)$$

$$\theta gFm = (Ng-NF)/(NF-NC)$$

where "Ng", "NF", "Nd", and "NC" respectively represent refractive indices for the g-line (435.8 nm), the F-line (486.1 nm), a d-line (587.6 nm), and the C-line (656.3 nm) of Fraunhofer Lines.

Thus, it is possible to achieve both the appropriate correction of the second-order spectrum of the axial chromatic aberration over the entire zoom range and the appropriate correction of the second-order spectrum of the lateral chromatic aberration at the wide-angle end.

Figure 11:
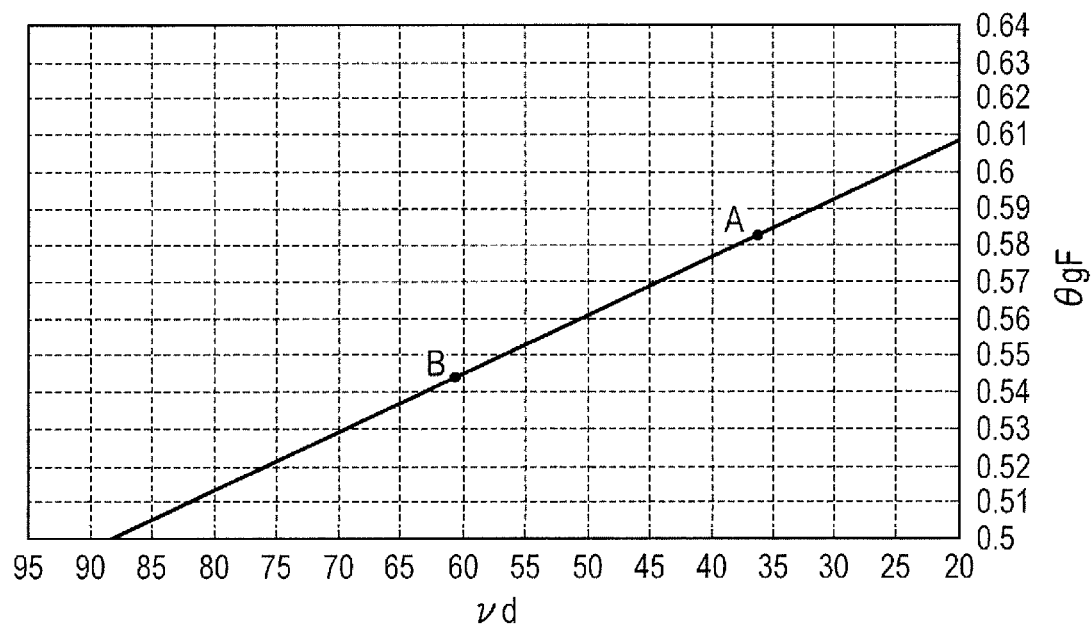
FIG. 11 is an explanatory graph showing a relationship between an Abbe constant νd and a partial dispersion ratio θgF.

The conditional expression (6) defines extraordinary dispersion of the optical material to be used for the g-line and the F-line with respect to a reference line of the partial dispersion. In FIG. 11, the point A indicates a value of PBM2 (product name; manufactured by OHARA INC.) (vd=36.26, θgF=0.5828). The point B indicates a value of NSL7 (product name; manufactured by OHARA INC.) (vd=60.49, θgF=0.5436). The line connecting the points A and B is regarded as the reference line. The optical material defined by the conditional expressions (6) and (7) is positioned above the reference line. If the optical material defined by the conditional expressions (6) and (7) is used as the refracting optical element having positive refractive power on the image side of the aperture stop, the use of the material positioned above the reference line is effective for correction of the second-order spectrum of the lateral chromatic aberration at the wide-angle end. In addition, as the material is positioned farther above the reference line, the correction effect becomes higher. In other words, the lens material satisfying the conditional expression (6) is usually called extraordinary dispersion glass. The case where the partial dispersion ratio is larger than the reference line means that the refractive index difference between the g-line and the F-line is relatively larger than that of reference glass.

If the value exceeds the upper limit value of the conditional expression (7), the second-order spectrum of the axial chromatic aberration at the wide-angle end is excessively corrected by the refracting optical element GNL, and hence it becomes difficult to keep a balance of the second-order spectrum between the axial chromatic aberration and the lateral chromatic aberration at the wide-angle end, in particular.

If the lower limit condition of the conditional expression (6) or (7) is not satisfied, it becomes difficult to provide a sufficient correction effect of the second-order spectrum of the lateral chromatic aberration at the wide-angle end to the refracting optical element GNL, and in particular it becomes difficult to obtain a sufficient correction effect of the second-order spectrum of the lateral chromatic aberration at the wide-angle end.

Note that, it is easy to conceive a method in which the optical material satisfying the conditional expressions (6) and (7) is disposed in a divided manner in a multiple elements in order to avoid difficulty in aberration correction and manufacturing process. Also in that case, it is possible to obtain the same effect as that described in this specification.

It is more preferred to simultaneously satisfy the following conditional expressions (8) and (9) as well. The expressions (8) and (9) define a relationship between a partial dispersion ratio θgdm and the Abbe constant νdm of the refracting optical element GNL.

$$-2.407 \times 10^{-3} \times \nu dm + 1.420 < \theta gdm \quad (8)$$

$$1.255 < \theta gdm < 1.670 \quad (9)$$

Here, the partial dispersion ratio θgdm regarding the g-line and the d-line is as follows.

$$\theta gdm = (Ng - Nd)/(NF - NC)$$

Thus, it becomes easy to perform correction of the chromatic aberration between the g-line and the d-line appropriately.

In addition, it is preferred to satisfy the following conditional expression (10). The conditional expression (10) defines a ratio of refractive power φm in the air of the refracting optical element GNL satisfying the conditional expressions (6) and (7) to refractive power φw of the entire lens system at the wide-angle end.

$$0.020 < \phi m/\phi w < 0.080 \quad (10)$$

Thus, it is possible to achieve both the appropriate correction of the second-order spectrum of the axial chromatic aberration over the entire zoom range and the appropriate correction of the second-order spectrum of the lateral chromatic aberration at the wide-angle end.

If the upper limit condition of the conditional expression (10) is not satisfied, the second-order spectrum of the lateral chromatic aberration at the wide-angle end is excessively corrected by the refracting optical element GNL, and hence it becomes difficult in particular to keep a balance of the second-order spectrum between the axial chromatic aberration and the lateral chromatic aberration at the wide-angle end.

If the lower limit condition of the conditional expression (10) is not satisfied, it becomes difficult to provide a sufficient correction effect of the second-order spectrum of the lateral chromatic aberration at the wide-angle end to the refracting optical element GNL, and in particular it becomes difficult to obtain a sufficient correction effect of the second-order spectrum of the lateral chromatic aberration at the wide-angle end.

Note that, if the multiple elements satisfying the conditional expressions (6) and (7) are used for the optical system, it is preferred that the sum of individual refractive powers satisfy the conditional expression (10).

Hereinafter, conditions for controlling back focus variation due to ambient temperature variation to be small are described.

The organic material such as a resin and plastic to be used for the refracting optical element GNL has an absolute value dn/dT of the refractive index variation due to temperature variation that is larger in a negative direction than that of glass, which is approximately 10 to 200 times, for example. Therefore, if an optical element made of an organic material having strong refractive power is used, it is necessary to maintain a small back focus variation due to ambient temperature variation. In this respect, it is easy to conceive a method of reducing the back focus variation due to ambient temperature variation by appropriately combining a multiple extraordinary dispersion materials including organic materials or the like having approximately the same value dn/dT. However, the use of this method increases the cost. Therefore, it is necessary to reduce the back focus variation amount due to ambient temperature variation by appropriately combining a minimum necessary number of refracting optical elements GNL and general glass.

A broadcasting camera system is usually a lens interchanging type, and a broadcasting zoom lens includes a flange back adjustment mechanism. In usual image taking, the flange back adjustment is performed immediately before the image taking so that a focal position of the lens agrees with a position of the image pickup element of the camera. If a shift of the flange back exceeds the focal depth remarkably, it is necessary to perform readjustment.

It is known that, usually, if the back focus variation amount due to ambient temperature variation of approximately ±8° C. falls within a focal depth range, it is substantially unnecessary to readjust the flange back during one image taking operation, and hence there is no practical problem. For instance, in a ⅔ type HD camera (image size diameter: 11 mm) that is generally used for broadcasting, when the diameter of a permissible circle of confusion is set to approximately 0.01 mm, the focal depth when an F number is F/1.8 becomes approximately ±18 µm. Here, a value (dskd/dT)t representing a back focus variation amount per unit temperature variation of the entire system is defined as follows.

$$(dskd/dT)t = (dskd/dT)l + (dskd/dT)m \quad (11)$$

where "(dskd/dT)l" represents a back focus variation amount per unit temperature variation of the lens system, and "(dskd/dT)m" represents a back focus variation amount per unit temperature variation of a lens barrel member for maintaining a space between lenses.

In order to control the back focus variation amount due to ambient temperature variation of ±8° C. to be within a focal depth of ±18.0 µm, it is only necessary that the value (dskd/dT)t of the back focus variation amount per unit temperature variation of the entire system be within ±2.2 µm/° C. In each embodiment, the refractive power and dn/dT of each lens, and a linear expansion coefficient of the lens barrel member for maintaining the space between lenses are defined so as to control the value (dskd/dT)t of the back focus variation amount per unit temperature variation of the entire system to be within ±2.2 µm/° C.

First, the back focus variation in a lens system due to ambient temperature variation is described. A value (dskd/dT)l representing the back focus variation amount per unit temperature variation of the lens system, which is the first term of the expression (11), is given as follows.

$$(dskd/dT)1 = \Sigma_{i,j}((dskd/dn)p_{ij} \times (dn/dT)p_{ij}) + \Sigma_{i,j}((dskd/dn)n_{ij} \times (dn/dT)n_{ij}) \quad (12)$$

where "$(dskd/dn)p_{ij}$" represents a back focus variation amount due to the refractive index variation of a j-th lens having positive refractive power in an i-th lens unit, "$(dskd/dn)n_{ij}$" represents a back focus variation amount due to the refractive index variation of the j-th lens having negative refractive power in the i-th lens unit, "dn/dT" represents a coefficient of the refractive index variation due to the temperature variation (average value in a range of −20° C. to 40° C.) on the e-line in the air, "$(dn/dT)p_{ij}$" represents the dn/dT of the j-th lens having positive refractive power in the i-th lens unit, and "$(dn/dT)n_{ij}$" represents the dn/dT of the j-th lens having negative refractive power in the i-th lens unit.

In general, an absolute value dskd/dn of the back focus variation amount due to the refractive index variation of each lens tends to increase in proportion to an absolute value of the refractive power of each lens. When the refractive power of each lens and the coefficient dn/dT of the refractive index variation due to the temperature variation are combined appropriately, the value (dskd/dT)l of the back focus variation amount per unit temperature variation of the lens system determined by the expression (12) can be controlled to be small.

For the purposes of the appropriate correction of the second-order spectrum of the axial chromatic aberration over the entire zoom range, the appropriate correction of the second-order spectrum of the lateral chromatic aberration at the wide-angle end, and the control of the (dskd/dT)l of the lens system at the wide-angle end to be small, it is preferred to satisfy the conditional expressions (6), (7), (13), and (14). The conditional expressions (13) and (14) are conditions for defining the refractive power and the coefficient dn/dT of the refractive index variation due to the temperature variation of each lens constituting the third lens unit U3, the first sub lens unit U4a, and the second sub lens unit U4b.

$$1.5 \times 10^{-5} < \Sigma_{i,j}(\phi p_{ij} \times (dn/dT)p_{ij})/\Sigma_i \phi_i < 3.0 \times 10^{-5} \ (i=3, 4a, 4b) \ (j=1, 2, \ldots, Sp_i) \quad (13)$$

$$-4.0 \times 10^{-5} < \Sigma_{i,j}(\phi n_{ij} \times (dn/dT)n_{ij})/\Sigma_i \phi_i < -2.5 \times 10^{-5} \ (i=3, 4a, 4b) \ (j=1, 2, \ldots, Sn_i) \quad (14)$$

where "dn/dT" represents the coefficient of the refractive index variation due to the temperature variation (average value in a range of −20 to 40° C.) on the e-line in the air, "$\phi p_{ij}$" represents the refractive power of the j-th lens having positive refractive power other than the GNL in the i-th lens unit, "$\phi n_{ij}$" represents the refractive power of the j-th lens having negative refractive power in the i-th lens unit, "$\phi_i$" represents the refractive power of the i-th lens unit, "$(dn/dT)p_{ij}$" represents the dn/dT of the j-th lens having positive refractive power other than the GNL in the i-th lens unit, "$(dn/dT)n_{ij}$" represents the dn/dT of the j-th lens having negative refractive power in the i-th lens unit, "$Sp_i$" represents the number of lenses having positive refractive power in the i-th lens unit other than the GNL, and "$Sn_i$" represents the number of lenses having negative refractive power in the i-th lens unit.

If the conditional expressions (13) and (14) are not satisfied, it becomes difficult to sufficiently correct the back focus shift due to the ambient temperature variation.

It is preferred to satisfy the following conditional expressions (15) and (16). The conditional expressions (15) and (16) are conditions for defining the refractive power and the coefficient dn/dT of the refractive index variation due to the temperature variation of each lens constituting the first sub lens unit U4a and the second sub lens unit U4b.

$$0.5 \times 10^{-5} < \Sigma_{i,j}(\phi p_{ij} \times (dn/dT)p_{ij})/\Sigma_i \phi_i < 1.5 \times 10^{-5} \ (i=4a, 4b) \ (j=1, 2, \ldots, Sp_i) \quad (15)$$

$$-1.3 \times 10^{-5} < \Sigma_{i,j}(\phi n_{ij} \times (dn/dT)n_{ij})/\Sigma_i \phi_i < -0.5 \times 10^{-5} \ (i=4a, 4b) \ (j=1, 2, \ldots, Sn_i) \quad (16)$$

Thus, while achieving both the appropriate correction of the second-order spectrum of the axial chromatic aberration over the entire zoom range and the appropriate correction of the second-order spectrum of the lateral chromatic aberration at the wide-angle end, the value (dskd/dT)l of the back focus variation amount per unit temperature variation at the wide-angle end is controlled to be small.

It is more preferred to satisfy the following conditional expressions (17) and (18). The conditional expressions (17) and (18) are conditions for defining the refractive power and the coefficient dn/dT of the refractive index variation due to the temperature variation of each lens constituting the second sub lens unit U4b.

$$0.4 \times 10^{-5} < \Sigma_{i,j}(\phi p_{ij} \times (dn/dT)p_{ij})/\Sigma_i \phi_i < 1.5 \times 10^{-5} \ (i=4b) \ (j=1, 2, \ldots, Sp_i) \quad (17)$$

$$-2.5 \times 10^{-5} < \Sigma_{i,j}(\phi n_{ij} \times (dn/dT)n_{ij})/\Sigma_i \phi_i < -1.5 \times 10^{-5} \ (i=4b) \ (j=1, 2, \ldots, Sn_i) \quad (18)$$

Thus, while achieving both the appropriate correction of the second-order spectrum of the axial chromatic aberration over the entire zoom range and the appropriate correction of the second-order spectrum of the lateral chromatic aberration at the wide-angle end, the value (dskd/dT)l of back focus variation amount per unit temperature variation at the wide-angle end is controlled to be small.

In addition, it is preferred to satisfy the following conditional expressions (19) and (20). The conditional expressions (19) and (20) are conditions for defining respective sums of refractive powers of lenses having positive refractive power other than the refracting optical element GNL and lenses having negative refractive power, which constitute the second sub lens unit U4b.

$$3.6 < \Sigma_j(\phi p 4b_j)/\phi 4b < 5.3 \ (j=1, 2, \ldots, Sp_i) \quad (19)$$

$$-4.5 < \Sigma_j(\phi n 4b_j)/\phi 4b < -3.0 \ (j=1, 2, \ldots, Sn_i) \quad (20)$$

Thus, good optical performance is achieved, and the value (dskd/dT)l of the back focus variation amount per unit temperature variation of the lens system is controlled to be small.

If the upper limit condition of the conditional expression (19) is not satisfied or if the lower limit condition of the conditional expression (20) is not satisfied, the lens refractive power is increased so that the aberration correction becomes difficult.

If the lower limit condition of the conditional expression (19) is not satisfied or if the upper limit condition of the conditional expression (20) is not satisfied, the lens refractive power is decreased so that it becomes difficult to secure a sufficient correction effect for the back focus shift due to the ambient temperature variation.

It is more preferred to satisfy the following conditional expressions (21) and (22). The conditional expressions (21) and (22) define refractive power and an Abbe constant vdp4b of a lens having positive refractive power in the second sub lens unit U4b.

$$50 < vdp4b < 70 \quad (21)$$

$$1.5 < \Sigma_j(\phi p 4b_{j\_r}/\phi 4b) < 6.0 \ (j=1, 2, \ldots, Sp_i) \quad (22)$$

where "φp4b_j_r" represents the refractive power of the j-th lens having positive refractive power using a glass material satisfying the conditional expression (21) among the lenses having positive refractive power in the second sub lens unit. Thus, good achromatization is achieved, and the value (dskd/dT)l of the back focus variation amount of the lens system due to the ambient temperature variation can be controlled to be small.

It is more preferred to set the numerical range of the conditional expression (21) as follows.

$$60 < vdp4b < 70 \quad (21a)$$

As the glass defined by the conditional expression (21), there are S-BSL7 (product name) (dn/dT=2.7×10$^{-6}$, vdp4b=64.1), S-BAL35 (product name) (dn/dT=3.7×10$^{-6}$, vdp4b=64.1), S-NSL36 (product name) (dn/dT=2.6×10$^{-6}$, vdp4b=52.4), and the like. dn/dT indicates a coefficient of refractive index variation due to temperature variation (an average value in a range of −20° C. to 40° C.) in the air on the e-line. With use of these materials for the second sub lens unit U4b as the lens having positive refractive power, good achromatization can be achieved, and the value (dskd/dT)l of the back focus variation amount of the lens system due to the ambient temperature variation can be controlled to be small.

If the upper limit condition of the conditional expression (22) is not satisfied, the refractive power of the lens having positive refractive power other than the refracting optical element GNL in the second sub lens unit U4b becomes large so that the aberration correction becomes difficult.

If the lower limit condition of the conditional expression (22) is not satisfied, it becomes difficult to secure, on the lens having positive refractive power other than the refracting optical element GNL in the second sub lens unit U4b, a sufficient correction effect for the back focus shift due to the ambient temperature variation.

It is more preferred to satisfy the following conditional expressions (23) and (24). The conditional expressions (23) and (24) define refractive power, an Abbe constant vdn4b, and a partial dispersion ratio θgFn4b of the lens having negative refractive power in the second sub lens unit U4b. Thus, good achromatization can be achieved, and the value (dskd/dT)l of the back focus variation amount of the lens system due to the ambient temperature variation can be controlled to be small.

$$0.6406 - 1.7735 \times 10^{-3} \times vdn4b > \theta gFn4b \quad (23)$$

$$-5.0 < \Sigma_j(\phi n4b_{j\_}r/\phi 4b) < -0.5 \; (j=1, 2, \ldots, Sn_i) \quad (24)$$

where "φn4b_j_r" represents the refractive power of the j-th lens having negative refractive power made of a glass material satisfying the conditional expression (23) among the lenses having negative refractive power in the second sub lens unit U4b.

As the glass defined by the conditional expression (23), there are S-LAH58 (product name) (dn/dT=5.0×10$^{-6}$, vdn4b=40.7, θgFn4b=0.566), S-LAH55 (product name) (dn/dT=4.8×10$^{-6}$, vdn4b=42.7, θgFn4b=0.564), and the like. dn/dT indicates a coefficient of refractive index variation due to temperature variation (an average value in a range of −20° C. to 40° C.) in the air on the e-line. The left-hand side of the conditional expression (23) for S-LAH58, 0.6406−1.7735×10$^{-3}$Δvdn4b, is 0.5684 and θgFn4b=0.5667, so that S-LAH58 satisfies the conditional expression (23). The left-hand side of the conditional expression (23) for S-LAH55, 0.6406−1.7735×10$^{-3}$×vdn4b, is 0.5648 and θgFn4b=0.5642, so that S-LAH55 satisfies the conditional expression (23). With use of these materials for the second sub lens unit U4b as the lens having negative refractive power, good achromatization can be achieved, and the value (dskd/dT)l of the back focus variation amount per unit temperature variation of the lens system can be controlled to be small.

If the upper limit condition of the conditional expression (24) is not satisfied, it becomes difficult to secure, on the lens having negative refractive power in the second sub lens unit U4b, a sufficient correction effect for the back focus shift due to the ambient temperature variation.

If the lower limit condition of the conditional expression (24) is not satisfied, the refractive power of the lens having negative refractive power in the second sub lens unit U4b becomes large so that the aberration correction becomes difficult.

Next, the back focus variation due to the ambient temperature variation caused by thermal expansion of the lens barrel member is described. The value (dskd/dT)m of the back focus variation amount per unit temperature variation caused by thermal expansion of the lens barrel member, which is the second term of the expression (11), is given as follows.

$$(dskd/dT)m = \Sigma_i((dskd/\Delta d)i \times d_i \times \alpha_i) \quad (25)$$

where "(dskd/Δd)i" represents the back focus variation amount due to a variation of an air interval from the first surface to the i-th surface in the first lens unit U1, "d_i" represents the length of the lens barrel member for maintaining the space between the i-th surface and the (i+1)th surface, and "α_i" represents the linear expansion coefficient of the lens barrel member for maintaining the space between the i-th surface and the (i+1)th surface.

In general, in the four-unit zoom lens, the value (dskd/dT)m of the back focus variation amount per unit temperature variation due to the thermal expansion of the lens barrel member which is determined by the expression (25), is a negative value. The value (dskd/dT)l of the back focus variation amount per unit temperature variation of the lens system, which is determined by the expression (12), and the value (dskd/dT)m cancel out each other. In order for the expression (12) and the expression (25) to cancel out each other appropriately, it is desired to use, for the lens barrel member, a material such as aluminum having a linear expansion coefficient $\alpha_i$ of 23×10$^{-6}$ (° C.$^{-1}$) or higher.

Hereinafter, there are described conditions for achieving both the appropriate optical performance and a change of the focal length range of the entire system when the varying-magnification optical system EXT is inserted.

It is preferred to satisfy the following conditional expression (26). The conditional expression (26) defines a ratio of a height h_k of the axial ray entering the first lens surface of the varying-magnification optical system EXT from the optical axis to a height h_k+1 of the axial ray exiting the final lens surface of the varying-magnification optical system EXT from the optical axis.

$$0.7 < h\_k/h\_k+1 < 2.5 \quad (26)$$

Thus, it is possible to achieve both the good optical performance and the change of the focal length range of the entire system when the varying-magnification optical system EXT is inserted.

When the conditional expression (26) is not satisfied, the lens refractive power in the varying-magnification optical system EXT becomes large so that the aberration correction becomes difficult.

It is preferred to satisfy the following conditional expression (27). The conditional expression (27) is a condition defining an inclination angle θ (degrees) of the axial ray passing through an air interval between the first sub lens unit U4a and the second sub lens unit U4b in the fourth lens unit U4 with respect to the optical axis.

$$-5° < \theta < +5° \quad (27)$$

Here, it is assumed that the angle θ has a positive value as an angle of a converging light beam with respect to the optical axis and has a negative value as an angle of a diverging light beam with respect to the optical axis and θ=0° C. in an afocal state.

Thus, it is possible to achieve both good optical performance when the varying-magnification optical system EXT is inserted and ensuring of necessary and sufficient back focus.

If the upper limit condition of the conditional expression (27) is not satisfied, the height of the axial ray passing through the second sub lens unit U4b becomes small, and hence it becomes difficult to ensure the necessary and sufficient back focus.

If the lower limit condition of the conditional expression (27) is not satisfied, the axial ray enters the varying-magnification optical system EXT at a diverging angle when the varying-magnification optical system EXT is inserted. Therefore, the lens refractive power of the varying-magnification optical system EXT is increased so that the aberration correction becomes difficult.

It is more preferred to set the numerical range of the conditional expression (27) to be as the following conditional expression (27a).

$$-3.5° < \theta < +3.5° \quad (27a)$$

It is preferred to satisfy the following conditional expression (28). The conditional expression (28) is a condition defining a ratio of a length D of an air interval between the first sub lens unit U4a and the second sub lens unit U4b, in which the varying-magnification optical system EXT is inserted, to a light beam effective diameter EA of the final lens surface in the first sub lens unit U4a.

$$0.500 < D/EA < 3.000 \quad (28)$$

Thus, it is possible to achieve both the good optical performance when the varying-magnification optical system EXT is inserted and reduction of the entire length of the varying-magnification optical system EXT.

If the air interval D increases relative to the light beam effective diameter EA so that the upper limit condition of the conditional expression (28) is not satisfied, it becomes difficult to reduce the entire length of the varying-magnification optical system EXT. In addition, if the light beam effective diameter EA decreases relative to the air interval D so that the upper limit condition of the conditional expression (28) is not satisfied, an entrance pupil diameter becomes small so that it becomes difficult to secure a necessary and sufficient aperture ratio.

If the air interval D decreases relative to the light beam effective diameter EA so that the lower limit condition of the conditional expression (28) is not satisfied, the lens refractive power in the varying-magnification optical system EXT increases so that the aberration correction becomes difficult. In addition, if the light beam effective diameter EA increases relative to the air interval D so that the lower limit condition of the conditional expression (28) is not satisfied, the lens diameter of the fourth lens unit U4 increases so that it becomes difficult to achieve reduction in size and weight and to obtain good optical performance with a simple lens structure.

Figure 9:
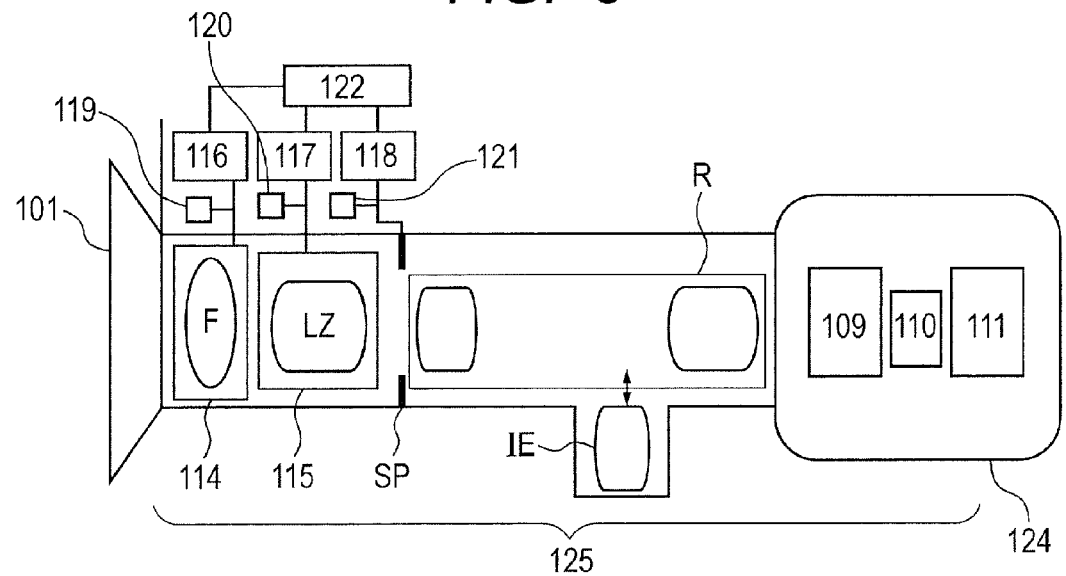
FIG. 9 is a schematic diagram of a main part of an image pickup apparatus according to the present invention.

With reference to FIG. 9, an overview of an image pickup apparatus (television camera system) using the zoom lens according to each embodiment as an image pickup optical system is described. FIG. 9 is a schematic diagram illustrating a main part of the image pickup apparatus according to the present invention. In FIG. 9, a zoom lens 101 according to any one of first to fourth embodiments and a camera 124 are provided. The zoom lens 101 is removably mounted to the camera 124. An image pickup apparatus 125 is constructed by mounting the zoom lens 101 to the camera 124.

The zoom lens 101 includes a first lens unit F, a magnification section LZ, and a fourth lens unit R for imaging. The first lens unit F includes a focusing lens unit. The magnification section LZ includes a second lens unit which moves on the optical axis during varying magnification and a third lens unit which moves on the optical axis so as to correct image plane variation due to magnification.

The zoom lens 101 includes an aperture stop SP. The fourth lens unit R includes a lens unit (varying-magnification optical system) IE which may be inserted onto or removed from the optical path.

The lens unit IE is provided to change the focal length range of the entire system of the zoom lens 101.

Drive mechanisms 114 and 115 such as helicoids and cams drive the first lens unit F and the magnification section LZ, respectively, in the optical axis direction.

Motors (drive units) 116 to 118 are provided to electrically drive the drive mechanisms 114 and 115 and the aperture stop SP.

Detectors 119 to 121 such as encoders, potentiometers, and photosensors detect positions of the first lens unit F and the magnification section LZ along the optical axis and a stop diameter of the aperture stop SP.

The camera 124 includes a glass block 109 corresponding to an optical filter or a color separation prism, and a solid-state image pickup element (photoelectric transducer) 110, such as a CCD sensor and a CMOS sensor, for receiving light of a subject image formed by the zoom lens 101.

CPUs 111 and 122 perform various kinds of drive control for the camera 124 and the main body of the zoom lens 101, respectively.

When the zoom lens according to the present invention is applied to the television camera system as described above, the image pickup apparatus having high optical performance is realized.

First Embodiment

FIG. 1 is a lens cross-sectional view when an object at infinity is focused at the wide-angle end of a zoom lens according to a first embodiment (Numerical Embodiment 1) of the present invention. First, FIG. 1 is described. The first lens unit U1 has positive refractive power and does not move for zooming. A first lens unit U1 has refractive power for focusing, and performs focusing by moving a whole or a part of the lens unit having the refractive power. A second lens unit (variator lens unit) U2 has negative refractive power and is movable for zooming. A third lens unit (compensator lens unit) U3 has negative refractive power and is movable for zooming. The third lens unit U3 moves on the optical axis along with movement of the second lens unit so as to correct image plane variation due to magnification-varying. The third lens unit U3 has negative refractive power in the first embodiment and other embodiments described later, but may alternatively have positive refractive power. An aperture stop SP is disposed on the image side of the third lens unit U3. A fourth lens unit (relay lens unit) U4 has positive refractive power for imaging and does not move for zooming. The fourth lens unit U4 includes a first sub lens unit U4a having positive refractive power and a second sub lens unit U4b having positive refractive power, which are separated by a largest air interval in the fourth lens unit. A glass block DG is a color separation prism or an optical filter. An image plane IP corresponds to an image pickup plane of a solid-state image pickup element (photoelectric transducer). A refracting optical element GNL is made of an optical material having extraordinary dispersion.

In Numerical Embodiment 1 corresponding to first embodiment, the refracting optical element GNL is made of an optical material (vdm=22.7, θgFm=0.689) shown in Table 9. The optical materials shown in FIG. 9 satisfies the conditional expression (6) since $-2.100 \times 10^{-3} \times vdm + 0.693 = 0.645$ and θgFm=0.689. In addition, the optical material is in a solid state when being used for the optical system, but may be in any state before being used for the optical system, for example, in the manufacturing process. For instance, in the manufacturing process, the optical material may be a liquid material or a solid-state material obtained by curing the liquid material. Note that, the optical material is sandwiched between the lenses, but the same effect for the chromatic aberration correction can be obtained even if the optical material is not sandwiched. In addition, as a matter of course, an optical material having a large value of dn/dT other than the optical material shown in Table 9 may be used for the refracting optical element GNL.

The third lens unit U3 includes one lens having positive refractive power and one lens having negative refractive power, and is constructed as a cemented lens in which the lens having negative refractive power and the lens having positive refractive power are arranged in an order from the object side and are cemented.

The first sub lens unit U4a includes three lenses having positive refractive power and one lens having negative refractive power, specifically, in an order from the object side, a biconvex positive lens, a biconvex positive lens, and a cemented lens in which a positive meniscus lens having a convex surface on the image side and a lens having negative refractive power are cemented.

The second sub lens unit U4b includes five lenses having positive refractive power and two lenses having negative refractive power, specifically, in an order from the object side, a lens having positive refractive power, a cemented lens in which a lens having negative refractive power and a lens having positive refractive power are cemented, a cemented lens in which a lens having positive refractive power, a lens having positive refractive power, and a lens having negative refractive power are cemented, and a lens having positive refractive power.

Table 10 shows corresponding values of each conditional expression according to the first embodiment. The first embodiment has a feature that the values are close to the upper limit values of the conditional expressions (10), (13), (14), (15), (17), (19), and (22), and close to the lower limit values of the conditional expressions (20) and (24).

Table 1 shows surface numbers and corresponding values of dn/dT, dskd/dN, and (dskd/dT)l of the back focus variation per unit temperature variation of the lens system according to Numerical Embodiment 1. As shown in Table 1, the sum of the value (dskd/dT)l of the back focus variation amount per unit temperature variation of the lens system is 2.561 µm/° C. Note that, the back focus variation amounts per unit temperature variation of the lens system are calculated for the third lens unit U3, the first sub lens unit U4a, and the second sub lens unit U4b. This is because the first lens unit U1 and the second lens unit U2 have small values of dskd/dn at the wide-angle end and hence have a small influence on the back focus variation due to the temperature variation. The same applies to all of the following embodiments.

Table 2 shows the surface numbers and corresponding values of the length of the lens barrel member for maintaining space between lenses, dskd/Ad, and the value (dskd/dT)m of the back focus variation amount per unit temperature variation of the lens barrel member according to Numerical Embodiment 1. As shown in Table 2, the sum of the value (dskd/dT)m of the back focus variation amount per unit temperature variation of the lens barrel member is −0.662 µm/° C. In the first embodiment, an aluminum member having a linear expansion coefficient $\alpha_i$ of $23 \times 10^{-6}$ (° C.$^{-1}$) is used for the lens barrel member. Note that, the back focus variation amount per unit temperature variation due to thermal expansion of the lens barrel member is calculated for the air interval positioned on the image side of the air interval between the second lens unit U2 and the third lens unit U3. This is because the first lens unit U1 and the second lens unit U2 have small values of dskd/Ad at the wide-angle end and hence have a small influence on the back focus variation due to the temperature variation. The same applies to all of the following embodiments.

Table 11 shows values of the focal depth at the wide-angle end, the back focus variation amounts per unit temperature variation of the lens system, the lens barrel member, and the entire system, and the back focus variation amount due to ambient temperature variation of ±8° C. according to the first embodiment. The values of the back focus variation amounts per unit temperature variation of the lens system and the lens barrel member shown in the field for the first embodiment in Table 11 are the sum of (dskd/dT)l shown in Table 1 and the sum of (dskd/dT)m shown in Table 2, respectively. The value of the back focus variation amount per unit temperature variation of the entire system shown in the field for the first embodiment in Table 11 is the sum of (dskd/dT)l shown in Table 1 plus the sum of (dskd/dT)m shown in Table 2.

In the first embodiment, when the refractive power and dn/dT of each lens, and the linear expansion coefficient of the lens barrel member for maintaining the space between lenses are defined, the value (dskd/dT)t of the back focus variation amount per unit temperature variation of the entire system is 1.899 µm/° C. as shown in Table 11. Therefore, the back focus variation amount due to the ambient temperature variation of ±8° C. of the entire system also falls within the focal depth.

Figure 2A:
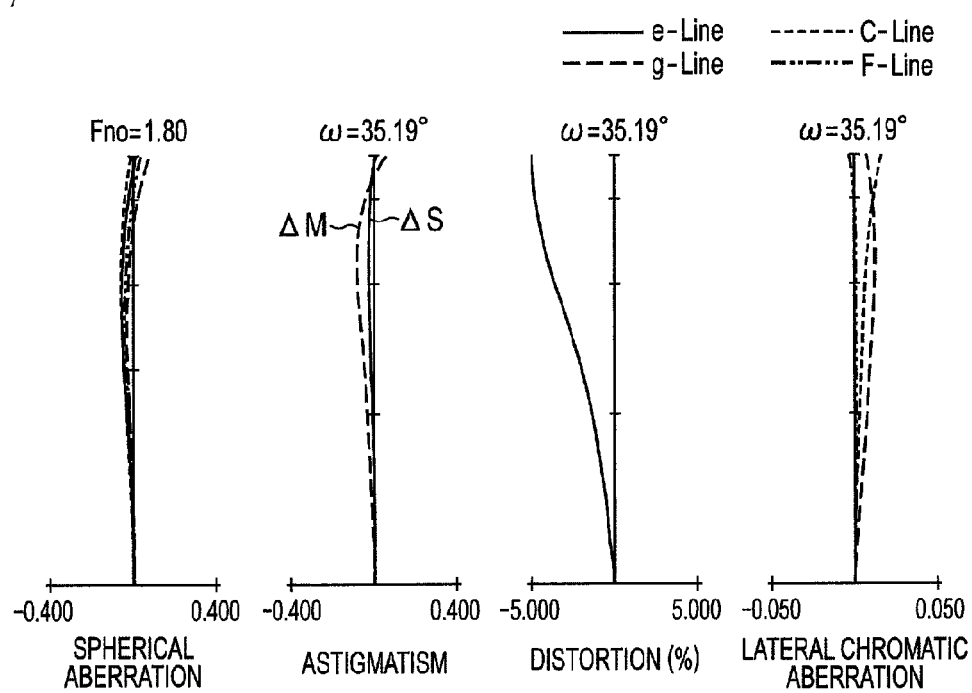
FIG. 2A is a longitudinal aberration diagram at the wide-angle end when an object distance is 2.5 m according to Numerical Embodiment 1.
Figure 2B:
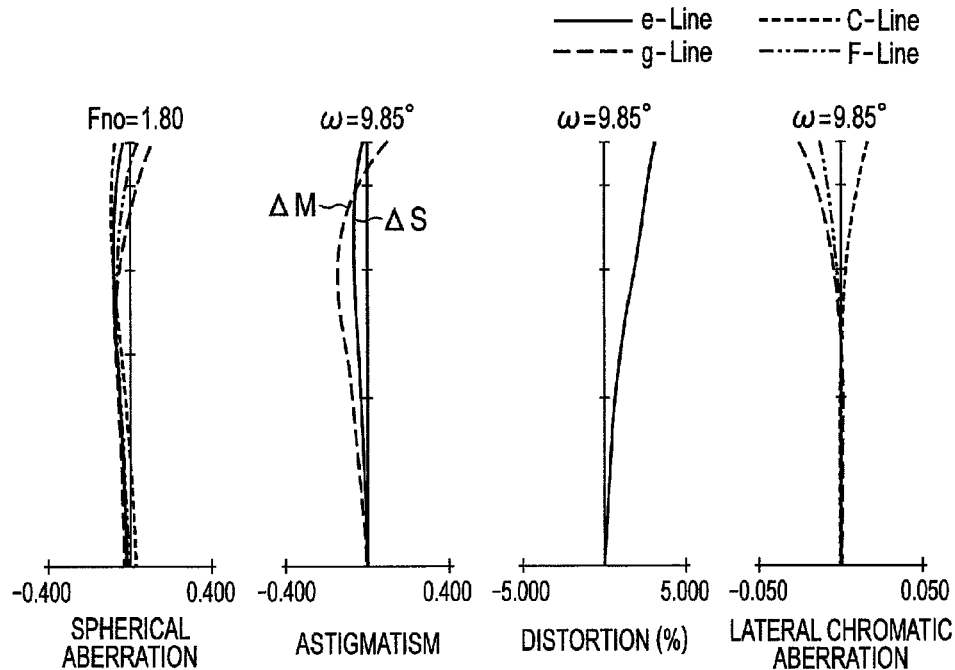
FIG. 2B is a longitudinal aberration diagram at a focal length of 31.67 mm when the object distance is 2.5 m according to Numerical Embodiment 1.
Figure 2C:
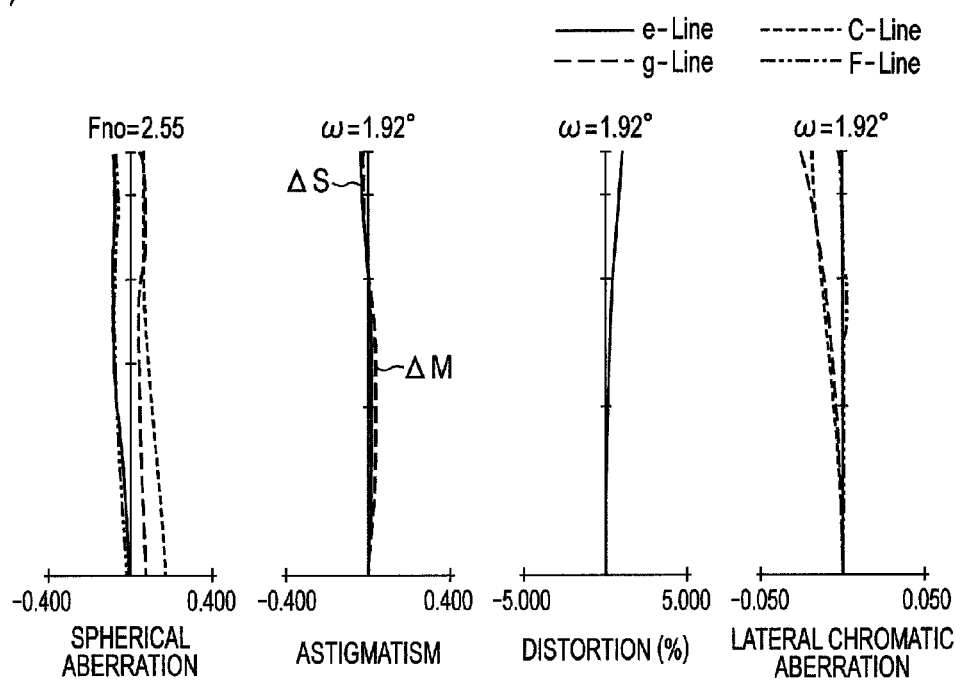
FIG. 2C is a longitudinal aberration diagram at a telephoto end when the object distance is 2.5 m according to Numerical Embodiment 1.

FIGS. 2A, 2B, and 2C are longitudinal aberration diagrams when an object at a distance of 2.5 m is focused at the wide-angle end, at a focal length of 31.67 mm, and at the telephoto end, respectively, according to Numerical Embodiment 1. Here, the value of the object distance corresponds a distance from a first surface in the first lens unit U1.

In the aberration diagrams, the spherical aberrations are illustrated by the e-line, the g-line, the C-line, and the F-line. The astigmatisms are illustrated by a meridional image plane (ΔM) on the e-line and a sagittal image plane (ΔS) on the e-line. The lateral chromatic aberrations are illustrated by the g-line, the C-line, and the F-line. "Fno" represents an F number, and "ω" represents a half angle of field. In addition, in the aberration diagrams, the spherical aberrations are illustrated in a scale of 0.4 mm, the astigmatisms are illustrated in a scale of 0.4 mm, the distortions are illustrated in a scale of 5%, and the lateral chromatic aberrations are illustrated in a scale of 0.05 mm.

Note that, the wide-angle end and the telephoto end refer to zoom positions when the second lens unit U2 during varying magnification is positioned at respective ends of its mechanically movable range on the optical axis.

In Numerical Embodiment 1 described below, a surface number "i" is an ordinal of the surface counted from the object side. In addition, "$r_i$" represents a curvature radius of an i-th surface counted from the object side, and "$d_i$" represents an interval between the i-th surface and an (i+1)-th surface which are counted from the object side. Further, "$N_i$" and "$v_i$" represent a refractive index and an Abbe number of an i-th optical material, respectively. Last three surfaces correspond to a glass block such as a filter.

Assume that the optical axis direction is an X-axis, a direction perpendicular to the optical axis is an H axis, and a light traveling direction is positive. In this case, when "R" represents a paraxial curvature radius, represents a conic constant, and "A3", "A4", "A5", "A6", "A7", "A8", "A9", "A10", "A11", and "A12" represent aspherical coefficients, an aspherical surface shape is expressed by the following expression.

$$X = \frac{H^2/R}{1+\sqrt{1-(1+k)(H/R)^2}} + A4H^4 + A6H^6 + A8H^8 + A10H^{10} + A12H^{12} + A3H^3 + A5H^5 + A7H^7 + A9H^9 + A11H^{11}$$

For example, "e-Z" represents "$\times 10^{-Z}$". The mark "*" represents the aspherical surface.

Numerical Embodiment 1

| Unit: mm | | | | | | | |
|---|---|---|---|---|---|---|---|
| Surface number | r | d | nd | vd | θgF | Effective diameter | Focal length |
| 1 | −274.646 | 1.80 | 1.72915 | 54.6 | 0.544 | 90.92 | −287.02 |
| 2 | 898.230 | 6.00 | | | | 87.85 | |
| 3 | 1914.258 | 1.80 | 1.80000 | 29.8 | 0.601 | 86.49 | −127.12 |
| 4 | 97.254 | 18.26 | 1.43875 | 94.9 | 0.534 | 84.98 | 142.69 |
| 5 | −166.824 | 0.15 | | | | 85.20 | |
| 6 | 200.643 | 7.37 | 1.59240 | 68.3 | 0.545 | 83.93 | 255.27 |
| 7 | −614.175 | 6.90 | | | | 83.57 | |
| 8 | 92.506 | 12.12 | 1.49699 | 81.5 | 0.537 | 78.53 | 152.78 |
| 9 | −412.049 | 0.14 | | | | 77.57 | |
| 10 | 66.953 | 5.97 | 1.72915 | 54.6 | 0.544 | 65.97 | 169.59 |
| 11 | 139.779 | (Variable) | | | | 64.95 | |
| 12* | 310.286 | 0.70 | 1.88299 | 40.7 | 0.566 | 27.75 | −17.06 |
| 13 | 14.434 | 6.18 | | | | 21.85 | |
| 14 | −121.452 | 6.35 | 1.80809 | 22.7 | 0.630 | 21.61 | 18.27 |
| 15 | −13.601 | 0.70 | 1.81600 | 46.6 | 0.556 | 21.43 | −12.80 |
| 16 | 47.190 | 0.29 | | | | 20.69 | |
| 17 | 24.757 | 6.05 | 1.53171 | 48.8 | 0.563 | 20.96 | 24.66 |
| 18 | −25.774 | 0.46 | | | | 20.64 | |
| 19 | −26.110 | 0.70 | 1.83480 | 42.7 | 0.564 | 20.04 | −34.56 |
| 20 | −263.828 | (Variable) | | | | 19.93 | |
| 21 | −28.945 | 1.00 | 1.74319 | 49.3 | 0.553 | 21.21 | −23.61 |
| 22 | 45.798 | 2.57 | 1.84666 | 23.7 | 0.620 | 23.38 | 53.46 |
| 23 | −24563.343 | (Variable) | | | | 23.82 | |
| 24 (Stop) | ∞ | 1.30 | | | | 27.75 | |
| 25 | 930.116 | 4.65 | 1.72342 | 37.9 | 0.583 | 28.89 | 55.30 |
| 26 | −41.990 | 0.15 | | | | 29.68 | |
| 27 | 108.501 | 3.44 | 1.73799 | 32.2 | 0.589 | 30.48 | 66.24 |
| 28 | −88.950 | 0.15 | | | | 30.47 | |
| 29 | −244.718 | 7.77 | 1.58913 | 61.1 | 0.540 | 30.19 | 51.11 |
| 30 | −27.222 | 1.00 | 1.80518 | 25.4 | 0.616 | 29.72 | −37.46 |
| 31 | −261.151 | 35.20 | | | | 29.97 | |
| 32 | 61.980 | 5.16 | 1.58913 | 61.1 | 0.540 | 29.97 | 50.09 |
| 33 | −54.999 | 1.03 | | | | 29.74 | |
| 34 | −141.885 | 1.00 | 1.88299 | 40.7 | 0.566 | 28.10 | −28.21 |
| 35 | 30.537 | 6.34 | 1.51633 | 64.1 | 0.535 | 27.03 | 42.43 |
| 36 | −72.997 | 0.20 | | | | 27.18 | |
| 37 | 38.761 | 6.57 | 1.51633 | 64.1 | 0.535 | 26.86 | 42.09 |
| 38 | −47.000 | 1.60 | 1.63555 | 22.7 | 0.689 | 26.17 | 119.14 |
| 39 | −29.500 | 1.00 | 1.88299 | 40.7 | 0.566 | 26.07 | −23.89 |
| 40 | 76.815 | 0.65 | | | | 25.73 | |
| 41 | 42.341 | 4.30 | 1.51633 | 64.1 | 0.535 | 26.02 | 51.07 |
| 42 | −68.157 | 4.50 | | | | 25.91 | |
| 43 | ∞ | 30.00 | 1.60342 | 38.0 | 0.579 | 40.00 | ∞ |
| 44 | ∞ | 16.20 | 1.51633 | 64.1 | 0.535 | 40.00 | ∞ |
| 45 | ∞ | | | | | 40.00 | |

Aspherical surface data
Twelfth surface

K = −1.89592e+002  A4 = 8.34507e−006  A6 = −6.71463e−008
A8 = 3.07779e−010  A10 = −9.69366e−013  A12 = 8.68049e−015
A3 = 1.53937e−006  A5 = 3.41602e−007  A7 = −6.02014e−010
A9 = 1.58086e−011  A11 = −1.70884e−013

Various data
Zoom ratio 21.00

| | Wide angle | Intermediate | Telephoto |
|---|---|---|---|
| Focal length | 7.80 | 31.67 | 163.81 |
| F number | 1.80 | 1.80 | 2.55 |
| Angle of field | 35.19 | 9.85 | 1.92 |
| Image height | 5.50 | 5.50 | 5.50 |
| Total lens length | 284.39 | 284.39 | 284.39 |
| BF | 5.38 | 5.38 | 5.38 |
| d11 | 0.67 | 36.74 | 53.38 |
| d20 | 55.71 | 13.97 | 5.33 |
| d23 | 4.85 | 10.52 | 2.52 |
| d31 | 35.20 | 35.20 | 35.20 |
| d45 | 5.38 | 5.38 | 5.38 |
| Entrance pupil position | 55.70 | 192.43 | 673.35 |
| Exit pupil position | 1349.05 | 1349.05 | 1349.05 |
| Front principal point position | 63.54 | 224.84 | 857.13 |
| Rear principal point position | 2.42 | −26.29 | −158.44 |

Zoom lens unit data

| Unit | Leading surface | Focal length | Lens structure length | Front principal point position | Rear principal point position |
|---|---|---|---|---|---|
| 1 | 1 | 70.90 | 60.54 | 38.19 | −0.29 |
| 2 | 12 | −13.06 | 21.46 | 1.97 | −12.21 |
| 3 | 21 | −42.80 | 3.58 | −0.06 | −2.02 |
| 4 | 24 | 37.71 | 18.46 | 3.14 | −8.34 |
| 5 | 32 | 52.60 | 78.55 | 7.69 | −45.96 |

TABLE 1

Back focus variations per unit
temperature variation of lens system ((dskd/dT)1)

| Surface number | dN/dT (×10⁻⁶/° C.) | dskd/dN (Note 1) | (dskd/dT)1 (μm/° C.) |
|---|---|---|---|
| 21 | 6.4 | 0.044 | 0.562 |
| 22 | 1.8 | −0.017 | −0.060 |
| 25 | 5.4 | −0.034 | −0.372 |

TABLE 1-continued

Back focus variations per unit
temperature variation of lens system ((dskd/dT)1)

| Surface number | dN/dT (×10⁻⁶/° C.) | dskd/dN (Note 1) | (dskd/dT)1 (μm/° C.) |
|---|---|---|---|
| 27 | 5.8 | −0.030 | −0.342 |
| 29 | 3.7 | −0.044 | −0.327 |
| 30 | 1.6 | 0.045 | 0.147 |
| 32 | 3.7 | −0.044 | −0.323 |
| 34 | 5.0 | 0.047 | 0.471 |
| 35 | 2.7 | −0.054 | −0.290 |
| 37 | 2.7 | −0.047 | −0.252 |
| 38 | −159.1 | −0.010 | 3.105 |
| 39 | 5.0 | 0.041 | 0.409 |
| 41 | 2.7 | −0.031 | −0.167 |
| Sum | | | 2.561 |

(Note 1)
unit of dskd: mm, dN = 0.0005

TABLE 2

Back focus variations per unit
temperature variation of lens barrel member ((dskd/dT)m)

| Surface number | Lens barrel member length (mm) | dskd/Δd (Note 2) | (dskd/dT)m (μm/° C.) |
|---|---|---|---|
| 20 | 53.881 | −0.021 | −0.275 |
| 23 | 4.849 | −0.187 | −0.217 |
| 24 | 1.412 | −0.187 | −0.063 |
| 26 | 3.935 | −0.016 | −0.015 |
| 28 | 0.998 | −0.017 | −0.004 |
| 31 | 37.470 | 0.000 | −0.001 |
| 33 | 2.381 | −0.111 | −0.063 |
| 36 | 3.879 | −0.025 | −0.023 |
| 40 | 1.613 | −0.004 | −0.002 |
| Sum | | | −0.662 |

(Note 2)
unit of dskd: mm, Δd = 0.1 mm

Second Embodiment

Figure 3:
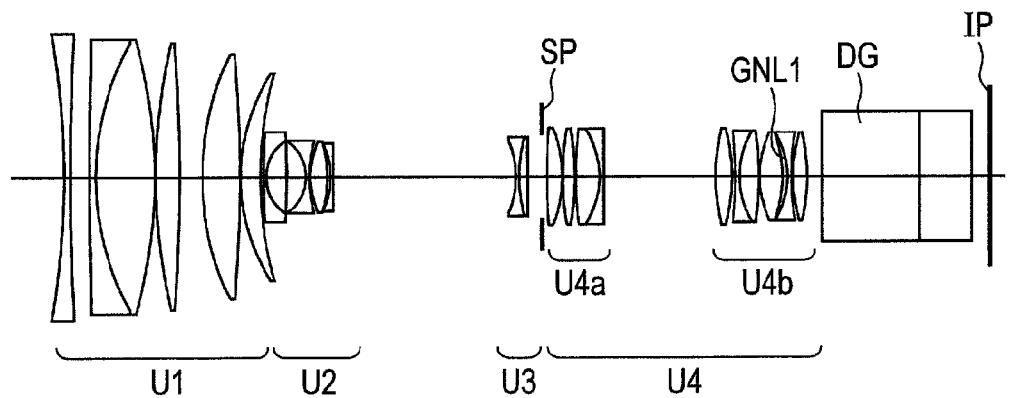
FIG. 3 is a cross-sectional view of a zoom lens at a wide-angle end in focus at infinity according to a second embodiment of the present invention.

FIG. 3 is a lens cross-sectional view when an object at infinity is focused at the wide-angle end of a zoom lens according to a second embodiment (Numerical Embodiment 2) of the present invention. First, FIG. 3 is described. The first lens unit U1 has positive refractive power and does not move for zooming. A first lens unit U1 has refractive power for focusing, and performs focusing by moving a whole or a part of the lens unit having the refractive power. A second lens unit (variator lens unit) U2 has negative refractive power and is movable for zooming. A third lens unit (compensator lens unit) U3 has negative refractive power and is movable for zooming. The third lens unit U3 moves on the optical axis along with movement of the second lens unit so as to correct image plane variation due to magnification-varying. An aperture stop SP is disposed on the image side of the third lens unit U3. A fourth lens unit (relay lens unit) U4 has positive refractive power for imaging and does not move for zooming. The fourth lens unit U4 includes a first sub lens unit U4a having positive refractive power and a second sub lens unit U4b having positive refractive power, which are separated by a largest air interval in the fourth lens unit. A glass block DG is a color separation prism or an optical filter. An image plane IP corresponds to an image pickup plane of a solid-state image pickup element (photoelectric transducer). A refracting optical element GNL is made of an optical material having extraordinary dispersion.

In Numerical Embodiment 2 corresponding to the second embodiment, the refracting optical element GNL is made of an optical material shown in Table 9. In addition, the optical material is in a solid state when being used for the optical system, but may be in any state before being used for the optical system, for example, in the manufacturing process. For instance, in the manufacturing process, the optical material may be a liquid material or a solid-state material obtained by curing the liquid material. Note that, the optical material is sandwiched between the lenses, but the same effect for the chromatic aberration correction can be obtained even if the optical material is not sandwiched. In addition, as a matter of course, an optical material having a large value of dn/dT other than the optical material shown in Table 9 may be used for the refracting optical element GNL.

The third lens unit U3 includes one lens having positive refractive power and one lens having negative refractive power, and is constructed as a cemented lens in which the lens having negative refractive power and the lens having positive refractive power are arranged in an order from the object side and are cemented.

The first sub lens unit U4a includes three lenses having positive refractive power and one lens having negative refractive power, specifically, in an order from the object side, a biconvex positive lens, a biconvex positive lens, and a cemented lens in which a biconvex positive meniscus lens and a lens having negative refractive power are cemented.

The second sub lens unit U4b includes five lenses having positive refractive power and two lenses having negative refractive power, specifically, in an order from the object side, a lens having positive refractive power, a cemented lens in which a lens having negative refractive power and a lens having positive refractive power are cemented, a cemented lens in which a lens having positive refractive power, a lens having positive refractive power, and a lens having negative refractive power are cemented, and a lens having positive refractive power.

Table 10 shows corresponding values of each conditional expression according to the second embodiment. The second embodiment has a feature that the values are close to the lower limit values of the conditional expressions (10), (13), (14), (15), (16), (17), (18), (19), and (22), and close to the upper limit values of the conditional expressions (20) and (24).

Table 3 shows surface numbers and corresponding values of dn/dT, dskd/dN, and (dskd/dT)l of the back focus variation per unit temperature variation of the lens system according to Numerical Embodiment 2. As shown in Table 3, the sum of the value (dskd/dT)l of the back focus variation amounts per unit temperature variation of the lens system is 2.780 μm/° C.

Table 4 shows the surface numbers and corresponding values of the length of the lens barrel member for maintaining space between lenses, dskd/Δd, and the value (dskd/dT)m of the back focus variation amount per unit temperature variation of the lens barrel member according to Numerical Embodiment 2. As shown in Table 4, the sum of the value (dskd/dT)m of the back focus variation amount per unit temperature variation of the lens barrel member is −0.656 μm/° C. In the second embodiment, an aluminum member having a linear expansion coefficient $\alpha_i$ of $23 \times 10^{-6}$ (° C.$^{-1}$) is used for the lens barrel member.

Table 11 shows values of the focal depth at the wide-angle end, the back focus variation amounts per unit temperature variation of the lens system, the lens barrel member, and the entire system, and the back focus variation amount due to ambient temperature variation of ±8° C. according to the second embodiment. The values of the back focus variation amounts per unit temperature variation of the lens system and the lens barrel member shown in the field for the second embodiment in Table 11 are the sum of (dskd/dT)l shown in Table 3 and the sum of (dskd/dT)m shown in Table 4, respectively. The value of the back focus variation amount per unit temperature variation of the entire system shown in the field for the second embodiment in Table 11 is the sum of (dskd/dT)l shown in Table 3 plus the sum of (dskd/dT)m shown in Table 4.

In the second embodiment, when the refractive power and dn/dT of each lens, and the linear expansion coefficient of the lens barrel member for maintaining the space between lenses are defined, the value (dskd/dT)t of the back focus variation amount per unit temperature variation of the entire system is 2.124 μm/° C. as shown in Table 11. Therefore, the back focus variation amount due to the ambient temperature variation of ±8° C. of the entire system also falls within the focal depth.

Figure 4A:
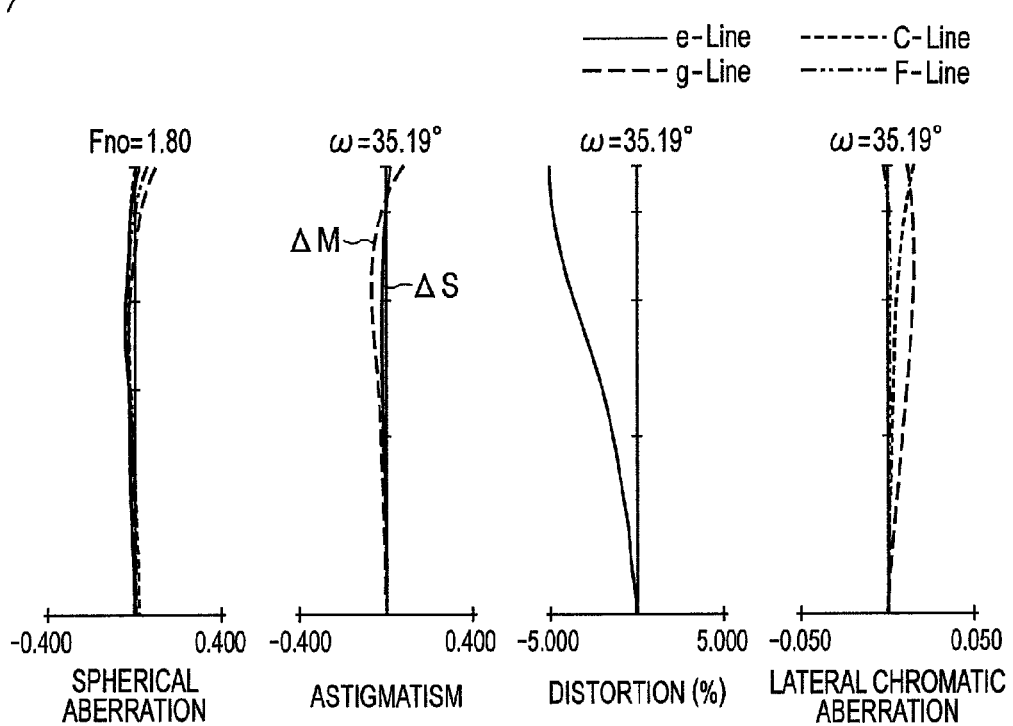
FIG. 4A is a longitudinal aberration diagram at the wide-angle end when the object distance is 2.5 m according to Numerical Embodiment 2.
Figure 4B:
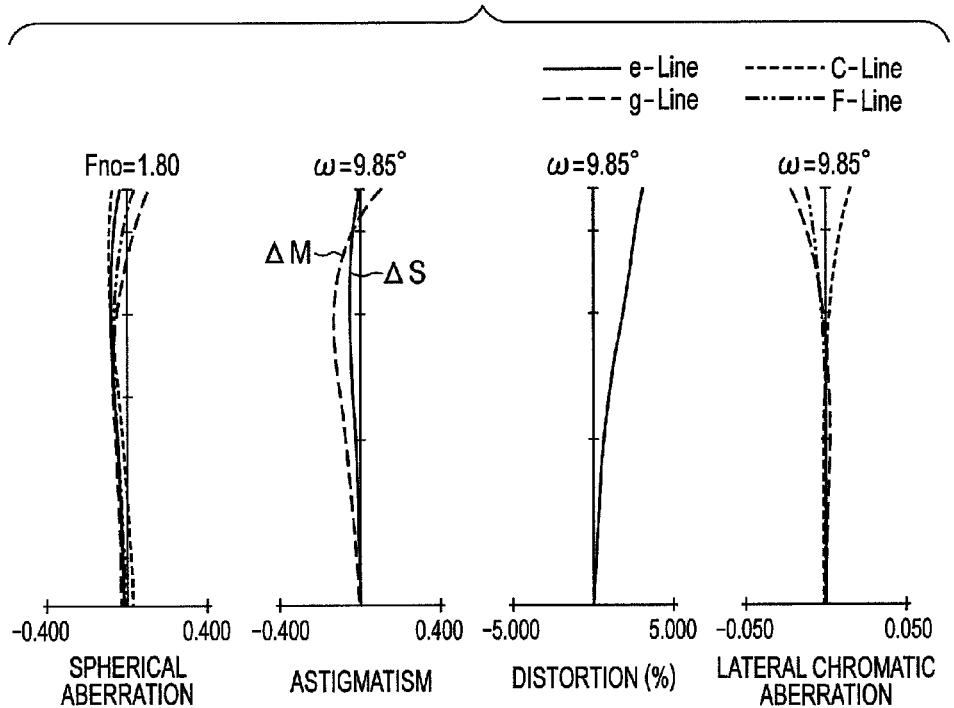
FIG. 4B is a longitudinal aberration diagram at a focal length of 31.67 mm when the object distance is 2.5 m according to Numerical Embodiment 2.
Figure 4C:
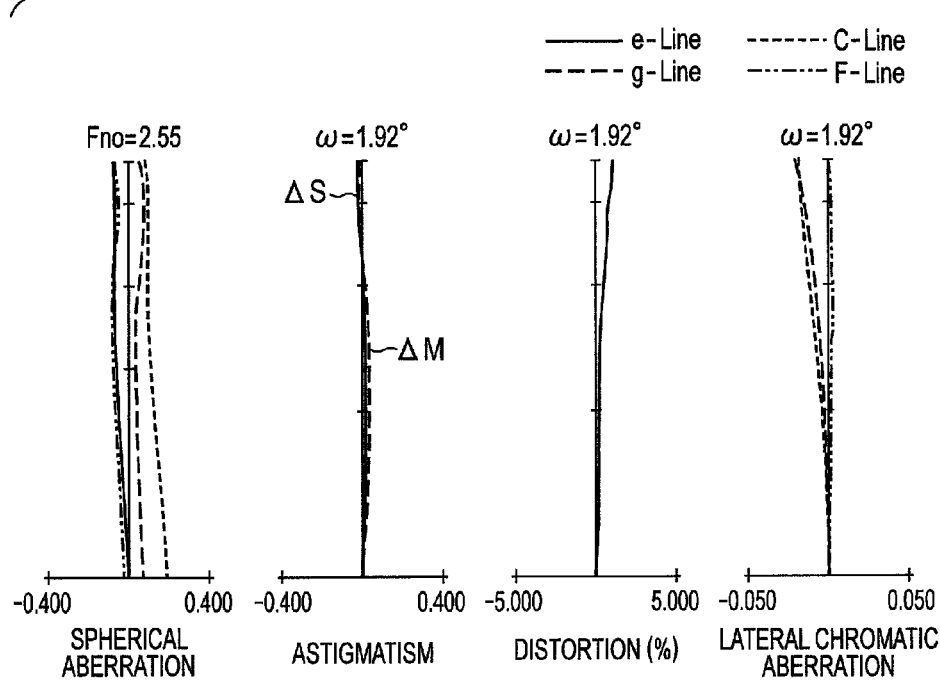
FIG. 4C is a longitudinal aberration diagram at the telephoto end when the object distance is 2.5 m according to Numerical Embodiment 2.

FIGS. 4A, 4B, and 4C are longitudinal aberration diagrams when an object at a distance of 2.5 m is focused at the wide-angle end, at a focal length of 31.67 mm, and at the telephoto end, respectively, according to Numerical Embodiment 2. Here, the value of the object distance corresponds to a distance from a first surface in the first lens unit U1.

In the aberration diagrams, the spherical aberrations are illustrated by the e-line, the g-line, the C-line, and the F-line. The astigmatisms are illustrated by a meridional image plane (ΔM) on the e-line and a sagittal image plane (ΔS) on the e-line. The lateral chromatic aberrations are illustrated by the g-line, the C-line, and the F-line. "Fno" represents an F number, and "ω" represents a half angle of field. In addition, in the aberration diagrams, the spherical aberrations are illustrated in a scale of 0.4 mm, the astigmatisms are illustrated in a scale of 0.4 mm, the distortions are illustrated in a scale of 5%, and the lateral chromatic aberrations are illustrated in a scale of 0.05 mm.

Note that, the wide-angle end and the telephoto end refer to zoom positions when the second lens unit U2 during varying magnification is positioned at respective ends of its mechanically movable range on the optical axis.

In Numerical Embodiment 2 described below, a surface number "i" is an ordinal of the surface counted from the object side. In addition, "$r_i$" represents a curvature radius of an i-th surface counted from the object side, and "$d_i$" represents an interval between the i-th surface and an (i+1)-th surface which are counted from the object side. Further, "$N_i$" and "$v_i$" represent a refractive index and an Abbe number of an i-th optical material, respectively. Last three surfaces correspond to a glass block such as a filter.

The mark "*" represents an aspherical surface.

Numerical Embodiment 2

| Unit: mm | | | | | | | |
|---|---|---|---|---|---|---|---|
| Surface number | r | d | nd | vd | θgF | Effective diameter | Focal length |
| 1 | −274.646 | 1.80 | 1.72915 | 54.6 | 0.544 | 90.98 | −287.02 |
| 2 | 898.230 | 6.00 | | | | 87.91 | |
| 3 | 1914.258 | 1.80 | 1.80000 | 29.8 | 0.601 | 86.53 | −127.12 |
| 4 | 97.254 | 18.26 | 1.43875 | 94.9 | 0.534 | 85.02 | 142.69 |
| 5 | −166.824 | 0.15 | | | | 85.24 | |
| 6 | 200.643 | 7.37 | 1.59240 | 68.3 | 0.545 | 83.97 | 255.27 |
| 7 | −614.175 | 6.90 | | | | 83.61 | |
| 8 | 92.506 | 12.12 | 1.49699 | 81.5 | 0.537 | 78.57 | 152.78 |
| 9 | −412.049 | 0.14 | | | | 77.62 | |
| 10 | 66.953 | 5.97 | 1.72915 | 54.6 | 0.544 | 66.00 | 169.59 |
| 11 | 139.779 | (Variable) | | | | 64.98 | |
| 12* | 310.286 | 0.70 | 1.88299 | 40.7 | 0.566 | 27.77 | −17.06 |
| 13 | 14.434 | 6.18 | | | | 21.86 | |
| 14 | −121.452 | 6.35 | 1.80809 | 22.7 | 0.630 | 21.61 | 18.27 |
| 15 | −13.601 | 0.70 | 1.81600 | 46.6 | 0.556 | 21.43 | −12.80 |
| 16 | 47.190 | 0.29 | | | | 20.70 | |
| 17 | 24.757 | 6.05 | 1.53171 | 48.8 | 0.563 | 20.96 | 24.66 |
| 18 | −25.774 | 0.46 | | | | 20.64 | |
| 19 | −26.110 | 0.70 | 1.83480 | 42.7 | 0.564 | 20.04 | −34.56 |
| 20 | −263.828 | (Variable) | | | | 19.93 | |
| 21 | −28.945 | 1.00 | 1.74319 | 49.3 | 0.553 | 21.21 | −23.61 |
| 22 | 45.798 | 2.57 | 1.84666 | 23.7 | 0.620 | 23.38 | 53.46 |
| 23 | −24563.343 | (Variable) | | | | 23.82 | |
| 24 (Stop) | ∞ | 1.30 | | | | 27.74 | |
| 25 | 799.913 | 4.65 | 1.72342 | 37.9 | 0.583 | 28.90 | 56.89 |
| 26 | −43.570 | 0.15 | | | | 29.72 | |
| 27 | 240.518 | 3.44 | 1.73799 | 32.2 | 0.589 | 30.43 | 109.40 |
| 28 | −122.139 | 0.15 | | | | 30.57 | |
| 29 | 109.206 | 7.77 | 1.58913 | 61.1 | 0.540 | 30.43 | 37.16 |
| 30 | −26.787 | 1.00 | 1.71736 | 29.5 | 0.604 | 30.13 | −35.06 |
| 31 | 480.618 | 35.20 | | | | 29.98 | |
| 32 | 69.726 | 5.16 | 1.51741 | 52.4 | 0.556 | 29.98 | 57.72 |
| 33 | −51.334 | 1.03 | | | | 29.78 | |
| 34 | −242.309 | 1.00 | 1.83400 | 37.1 | 0.577 | 28.11 | −34.96 |
| 35 | 33.458 | 6.34 | 1.48749 | 70.2 | 0.530 | 27.16 | 50.22 |
| 36 | −86.698 | 0.20 | | | | 27.26 | |
| 37 | 37.760 | 6.57 | 1.51633 | 64.1 | 0.535 | 26.91 | 41.50 |
| 38 | −47.000 | 1.60 | 1.63555 | 22.7 | 0.689 | 26.21 | 158.83 |
| 39 | −32.600 | 1.00 | 1.88299 | 40.7 | 0.566 | 26.03 | −27.97 |
| 40 | 105.891 | 0.65 | | | | 25.61 | |
| 41 | 45.692 | 4.30 | 1.48749 | 70.2 | 0.530 | 25.68 | 66.20 |
| 42 | −107.747 | 4.50 | | | | 25.40 | |
| 43 | ∞ | 30.00 | 1.60342 | 38.0 | 0.579 | 40.00 | ∞ |
| 44 | ∞ | 16.20 | 1.51633 | 64.1 | 0.535 | 40.00 | ∞ |
| 45 | ∞ | | | | | 40.00 | |

Aspherical surface data
Twelfth surface

K = −1.89592e+002   A4 = 8.34507e−006   A6 = −6.71463e−008
A8 = 3.07779e−010   A10 = −9.69366e−013   A12 = 8.68049e−015
A3 = 1.53937e−006   A5 = 3.41602e−007   A7 = −6.02014e−010
A9 = 1.58086e−011   A11 = −1.70884e−013

Various data
Zoom ratio 21.00

| | Wide angle | Intermediate | Telephoto |
|---|---|---|---|
| Focal length | 7.80 | 31.67 | 163.79 |
| F number | 1.80 | 1.80 | 2.55 |
| Angle of field | 35.19 | 9.85 | 1.92 |
| Image height | 5.50 | 5.50 | 5.50 |
| Total lens length | 283.81 | 283.81 | 283.81 |
| BF | 4.79 | 4.79 | 4.79 |
| d11 | 0.67 | 36.74 | 53.38 |
| d20 | 55.71 | 13.97 | 5.33 |
| d23 | 4.85 | 10.52 | 2.52 |
| d31 | 35.20 | 35.20 | 35.20 |
| d45 | 4.79 | 4.79 | 4.79 |
| Entrance pupil position | 55.70 | 192.43 | 673.35 |
| Exit pupil position | 2069.74 | 2069.74 | 2069.74 |
| Front principal point position | 63.52 | 224.58 | 850.13 |
| Rear principal point position | −3.01 | −26.87 | −159.00 |

-continued

Unit: mm

Zoom lens unit data

| Unit | Leading surface | Focal length | Lens structure length | Front principal point position | Rear principal point position |
|---|---|---|---|---|---|
| 1 | 1 | 70.90 | 60.54 | 38.19 | −0.29 |
| 2 | 12 | −13.06 | 21.46 | 1.97 | −12.21 |
| 3 | 21 | −42.80 | 3.58 | −0.06 | −2.02 |
| 4 | 24 | 37.71 | 18.46 | 3.14 | −8.30 |
| 5 | 32 | 52.60 | 78.55 | 7.02 | −46.55 |

TABLE 3

Back focus variations per unit
temperature variation of lens system ((dskd/dT)1)

| Surface number | dN/dT (×10⁻⁶/° C.) | dskd/dN (Note 3) | (dskd/dT)1 (μm/° C.) |
|---|---|---|---|
| 21 | 6.4 | 0.044 | 0.562 |
| 22 | 1.8 | −0.017 | −0.060 |
| 25 | 5.4 | −0.033 | −0.360 |
| 27 | 5.8 | −0.018 | −0.208 |
| 29 | 3.7 | −0.064 | −0.477 |
| 30 | 4.6 | 0.054 | 0.494 |
| 32 | 2.6 | −0.043 | −0.222 |
| 34 | 7.9 | 0.041 | 0.643 |
| 35 | −0.8 | −0.049 | 0.078 |
| 37 | 2.7 | −0.048 | −0.257 |
| 38 | −159.1 | −0.007 | 2.199 |
| 39 | 5.0 | 0.035 | 0.350 |
| 41 | −0.8 | −0.025 | 0.039 |
| Sum | | | 2.780 |

(Note 3)
unit of dskd: mm, and dN = 0.0005

TABLE 4

Back focus variations per unit
temperature variation of lens barrel member ((dskd/dT)m)

| Surface number | Lens barrel member length (mm) | dskd/Δd (Note 4) | (dskd/dT)m (μm/° C.) |
|---|---|---|---|
| 20 | 53.882 | −0.021 | −0.275 |
| 23 | 4.849 | −0.187 | −0.217 |
| 24 | 1.431 | −0.187 | −0.064 |
| 26 | 3.244 | −0.018 | −0.014 |
| 28 | 2.176 | 0.000 | 0.000 |
| 31 | 36.597 | 0.000 | 0.000 |
| 33 | 2.829 | −0.084 | −0.057 |
| 36 | 3.759 | −0.025 | −0.023 |
| 40 | 1.715 | −0.015 | −0.006 |
| Sum | | | −0.656 |

(Note 4)
unit of dskd: mm, Δd = 0.1 mm

Third Embodiment

Figure 5:
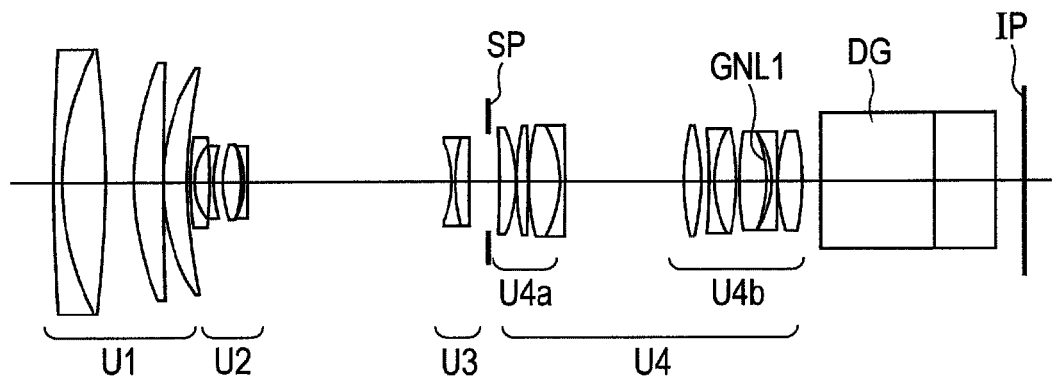
FIG. 5 is a cross-sectional view of a zoom lens at a wide-angle end in focus at infinity according to a third embodiment of the present invention.

FIG. 5 is a lens cross-sectional view when an object at infinity is focused at the wide-angle end of a zoom lens according to a third embodiment (Numerical Embodiment 3) of the present invention. First, FIG. 5 is described. The first lens unit U1 has positive refractive power and does not move for zooming. A first lens unit U1 has refractive power for focusing, and performs focusing by moving a whole or a part of the lens unit having the refractive power. A second lens unit (variator lens unit) U2 has negative refractive power and is movable for zooming. A third lens unit (compensator lens unit) U3 has negative refractive power and is movable during zooming. The third lens unit U3 moves on the optical axis along with movement of the second lens unit so as to correct image plane variation due to magnification-varying. An aperture stop SP is disposed on the image side of the third lens unit U3. A fourth lens unit (relay lens unit) U4 has positive refractive power for imaging and does not move for zooming. The fourth lens unit U4 includes a first sub lens unit U4a having positive refractive power and a second sub lens unit U4b having positive refractive power, which are separated by a largest air interval in the fourth lens unit. A glass block DG is a color separation prism or an optical filter. An image plane IP corresponds to an image pickup plane of a solid-state image pickup element (photoelectric transducer). A refracting optical element GNL is made of an optical material having extraordinary dispersion.

In Numerical Embodiment 3 corresponding to the third embodiment, the refracting optical element GNL is made of an optical material shown in Table 9. In addition, the optical material is in a solid state when being used for the optical system, but may be in any state before being used for the optical system, for example, in the manufacturing process. For instance, in the manufacturing process, the optical material may be a liquid material or a solid-state material obtained by curing the liquid material. Note that, the optical material is sandwiched between the lenses, but the same effect for the chromatic aberration correction can be obtained even if the optical material is not sandwiched. In addition, as a matter of course, an optical material having a large value of dn/dT other than the optical material shown in Table 9 may be used for the refracting optical element GNL.

The third lens unit U3 includes one lens having positive refractive power and one lens having negative refractive power, and is constructed as a cemented lens in which the lens having negative refractive power and the lens having positive refractive power are arranged in an order from the object side and are cemented.

The first sub lens unit U4a includes three lenses having positive refractive power and one lens having negative refractive power, specifically, in an order from the object side, a positive lens having a convex surface on the image side, a positive meniscus lens having a convex surface on the object side, and a cemented lens in which a biconvex positive lens and a lens having negative refractive power are cemented.

The second sub lens unit U4b includes five lenses having positive refractive power and two lenses having negative refractive power, specifically, in an order from the object side, a lens having positive refractive power, a cemented lens in which a lens having negative refractive power and a lens having positive refractive power are cemented, a cemented lens in which a lens having positive refractive power, a lens having positive refractive power, and a lens having negative refractive power are cemented, and a lens having positive refractive power.

Table 10 shows corresponding values of each conditional expression according to the third embodiment. The third embodiment has a feature that the values are close to the upper limit values of the conditional expressions (5), (16), and (18), and close to the lower limit values of the conditional expressions (13) and (15).

Table 5 shows surface numbers and corresponding values of dn/dT, dskd/dN, and (dskd/dT)l of the back focus variation per unit temperature variation of the lens system according to Numerical Embodiment 3. As shown in Table 5, the sum of the value (dskd/dT)l of the back focus variation amount per unit temperature variation of the lens system is 2.812 μm/° C.

Table 6 shows the surface numbers and corresponding values of the length of the lens barrel member for maintaining space between lenses, dskd/Ad, and the value (dskd/dT)m of the back focus variation amount per unit temperature variation of the lens barrel member according to Numerical Embodiment 3. As shown in Table 6, the sum of the value (dskd/dT)m of the back focus variation amounts per unit temperature variation of the lens barrel member is −0.698 μm/° C. In the third embodiment, an aluminum member having a linear expansion coefficient $\alpha_i$ of $23 \times 10^{-6}$ ($° C.^{-1}$) is used for the lens barrel member.

Table 11 shows values of the focal depth at the wide-angle end, the back focus variation amounts per unit temperature variation of the lens system, the lens barrel member, and the entire system, and the back focus variation amount due to ambient temperature variation of ±8° C. according to the third embodiment. The values of the back focus variation amounts per unit temperature variation of the lens system and the lens barrel member shown in the field for the third embodiment in Table 11 are the sum of (dskd/dT)l shown in Table 5 and the sum of (dskd/dT)m shown in Table 6, respectively. The value of the back focus variation amount per unit temperature variation of the entire system shown in the field for the third embodiment in Table 11 is the sum of (dskd/dT)l shown in Table 5 plus the sum of (dskd/dT)m shown in Table 6.

In the third embodiment, when the refractive power and dn/dT of each lens, and the linear expansion coefficient of the lens barrel member for maintaining the space between lenses are defined, the value (dskd/dT)t of the back focus variation amount per unit temperature variation of the entire system is 2.114 μm/° C. as shown in Table 11. Therefore, the back focus variation amount due to the ambient temperature variation of ±8° C. of the entire system also falls within the focal depth.

Figure 6A:
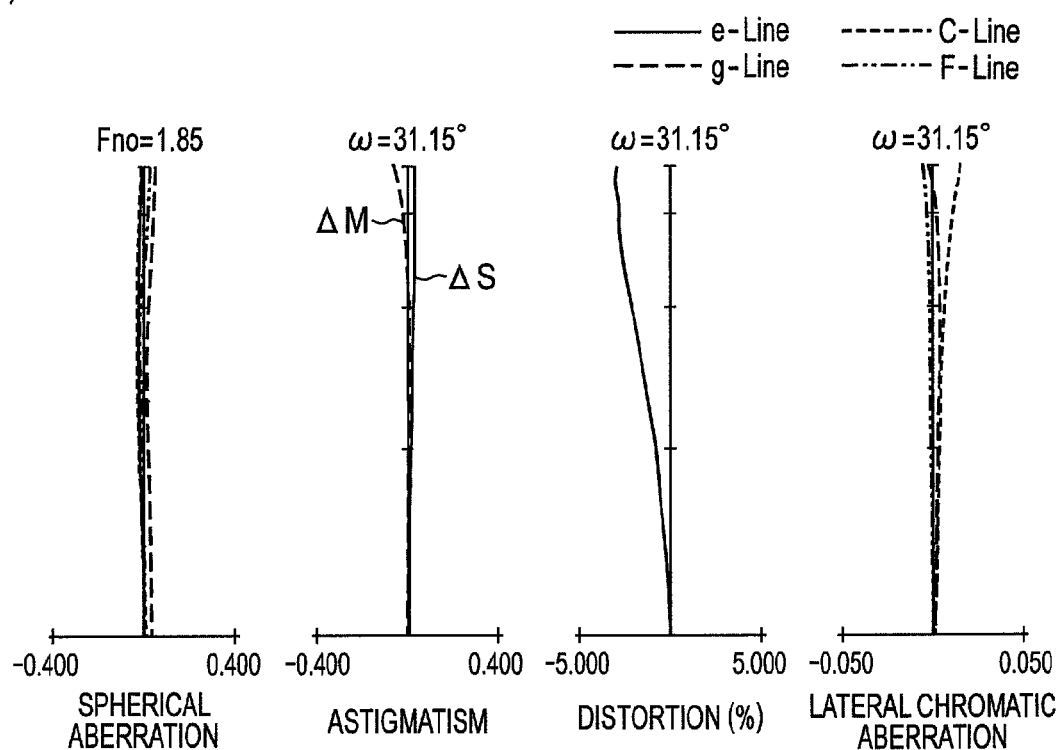
FIG. 6A is a longitudinal aberration diagram at the wide-angle end when the object distance is 3.0 m according to Numerical Embodiment 3.
Figure 6B:
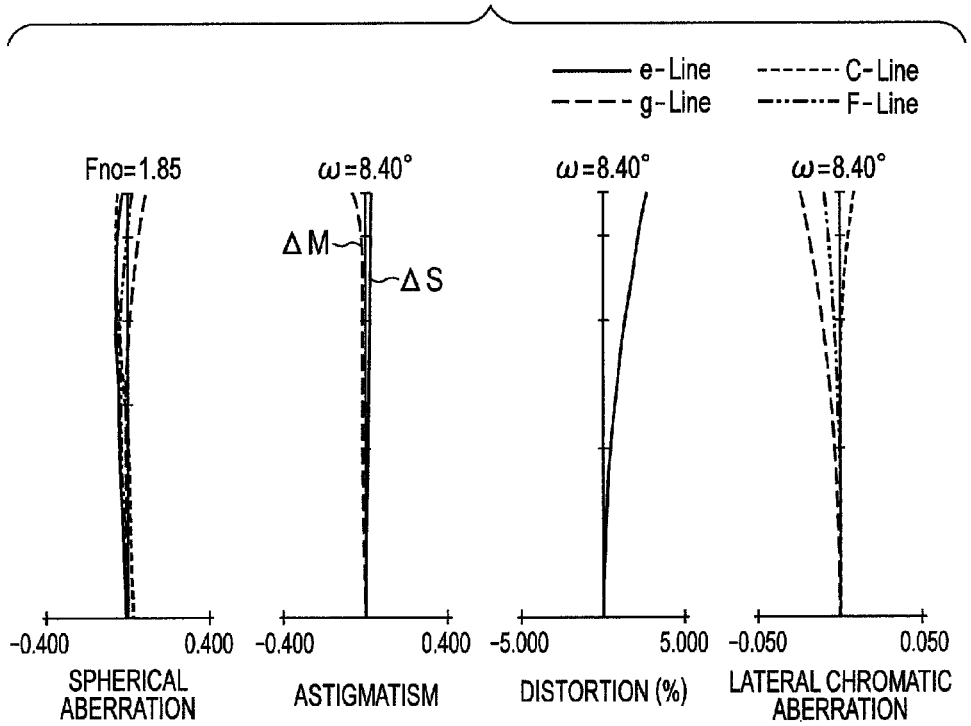
FIG. 6B is a longitudinal aberration diagram at a focal length of 37.21 mm when the object distance is 3.0 m according to Numerical Embodiment 3.
Figure 6C:
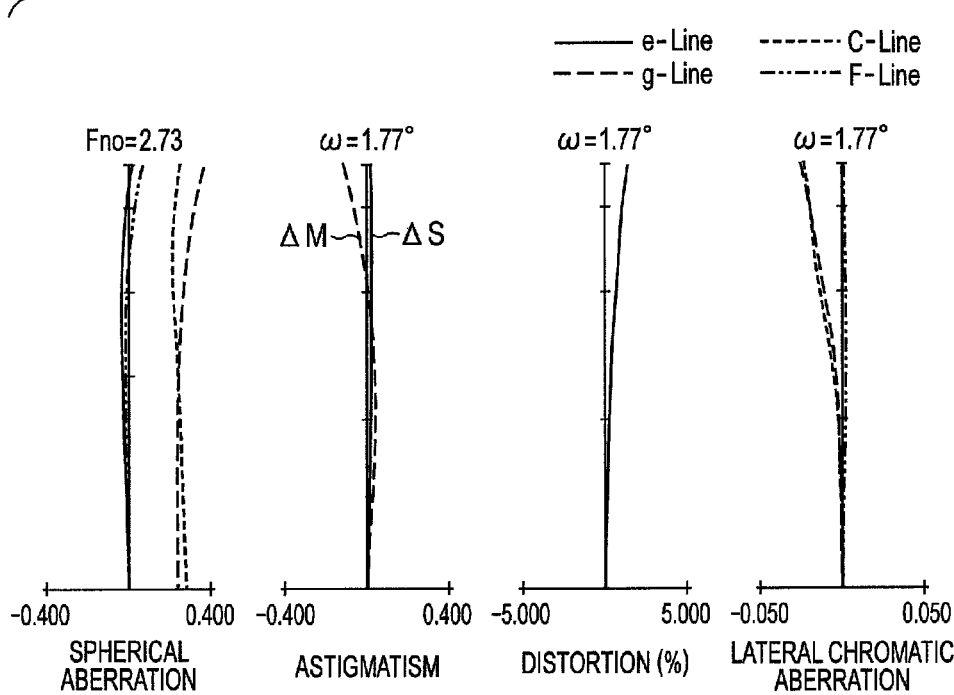
FIG. 6C is a longitudinal aberration diagram at the telephoto end when the object distance is 3.0 m according to Numerical Embodiment 3.

FIGS. 6A, 6B, and 6C are longitudinal aberration diagrams when an object at a distance of 3.0 m is focused at the wide-angle end, at a focal length of 37.21 mm, and at the telephoto end, respectively, according to Numerical Embodiment 3. Here, the value of the object distance corresponds to a distance from a first surface in the first lens unit U1.

In the aberration diagrams, the spherical aberrations are illustrated by the e-line, the g-line, the C-line, and the F-line. The astigmatisms are illustrated by a meridional image plane (ΔM) on the e-line and a sagittal image plane (ΔS) on the e-line. The lateral chromatic aberrations are illustrated by the g-line, the C-line, and the F-line. "Fno" represents an F number, and "ω" represents a half angle of field. In addition, in the aberration diagrams, the spherical aberrations are illustrated in a scale of 0.4 mm, the astigmatisms are illustrated in a scale of 0.4 mm, the distortions are illustrated in a scale of 5%, and the lateral chromatic aberrations are illustrated in a scale of 0.05 mm.

Note that, the wide-angle end and the telephoto end refer to zoom positions when the second lens unit U2 during varying magnification is positioned at respective ends of its mechanically movable range on the optical axis.

In Numerical Embodiment 3 described below, a surface number "i" is an ordinal of the surface counted from the object side. In addition, "$r_i$" represents a curvature radius of an i-th surface counted from the object side, and "$d_i$" represents an interval between the i-th surface and an (i+1)-th surface which are counted from the object side. Further, "$N_i$" and "$v_i$" represent a refractive index and an Abbe number of an i-th optical material, respectively.

Last three surfaces correspond to a glass block such as a filter.

The mark "*" represents an aspherical surface.

Numerical Embodiment 3

| Unit: mm | | | | | | | |
|---|---|---|---|---|---|---|---|
| Surface number | r | d | nd | vd | θgF | Effective diameter | Focal length |
| 1 | 600.260 | 2.20 | 1.75519 | 27.5 | 0.604 | 72.83 | −123.969 |
| 2 | 81.461 | 11.41 | 1.49699 | 81.6 | 0.537 | 69.52 | 128.996 |
| 3 | −290.956 | 7.63 | | | | 69.08 | |
| 4 | 86.701 | 7.86 | 1.62041 | 60.2 | 0.542 | 65.45 | 143.131 |
| 5 | 3044.709 | 0.15 | | | | 64.99 | |
| 6 | 66.016 | 6.00 | 1.72915 | 54.6 | 0.544 | 61.52 | 159.729 |
| 7 | 145.708 | (Variable) | | | | 60.42 | |
| 8 | 111.444 | 0.80 | 1.88299 | 40.7 | 0.566 | 23.69 | −22.381 |
| 9 | 16.811 | 4.65 | | | | 20.02 | |
| 10 | −47.842 | 0.70 | 1.81600 | 46.6 | 0.557 | 19.80 | −24.048 |
| 11 | 33.778 | 2.23 | | | | 19.26 | |
| 12 | 28.944 | 5.20 | 1.80518 | 25.4 | 0.615 | 19.72 | 18.632 |
| 13 | −29.192 | 0.54 | | | | 19.30 | |
| 14 | −24.664 | 0.70 | 1.78800 | 47.3 | 0.556 | 18.92 | −26.207 |
| 15 | 132.572 | (Variable) | | | 18.44 | | |
| 16 | −28.804 | 0.75 | 1.74319 | 49.3 | 0.553 | 20.24 | −21.638 |
| 17 | 37.218 | 3.80 | 1.84666 | 23.7 | 0.620 | 22.23 | 47.260 |
| 18 | 449.023 | (Variable) | | | | 23.12 | |
| 19 (Stop) | ∞ | 2.91 | | | | 25.98 | |
| 20 | −405.878 | 4.36 | 1.72342 | 37.9 | 0.583 | 28.07 | 60.830 |
| 21 | −40.105 | 0.28 | | | | 28.96 | |
| 22 | 78.871 | 2.57 | 1.52249 | 59.8 | 0.543 | 30.06 | 169.849 |
| 23 | 679.454 | 0.25 | | | | 30.10 | |
| 24 | 57.613 | 8.13 | 1.51741 | 52.4 | 0.556 | 30.23 | 43.605 |
| 25 | −35.556 | 1.66 | 1.80518 | 25.4 | 0.616 | 29.83 | −47.835 |
| 26 | −425.632 | 31.00 | | | | 29.97 | |
| 27 | 63.836 | 4.86 | 1.51741 | 52.4 | 0.556 | 29.97 | 57.903 |
| 28 | −55.458 | 1.96 | | | | 29.80 | |
| 29 | −117.768 | 1.40 | 1.88299 | 40.7 | 0.566 | 27.96 | −27.767 |
| 30 | 31.367 | 6.02 | 1.51633 | 64.1 | 0.535 | 27.01 | 40.500 |
| 31 | −59.276 | 0.63 | | | | 27.02 | |
| 32 | 83.878 | 7.13 | 1.51633 | 64.1 | 0.535 | 26.25 | 50.559 |
| 33 | −37.000 | 1.40 | 1.63555 | 22.7 | 0.689 | 25.46 | 158.603 |
| 34 | −27.540 | 1.40 | 1.88299 | 40.7 | 0.566 | 25.43 | −32.956 |
| 35 | −477.264 | 0.21 | | | | 25.86 | |
| 36 | 46.892 | 6.41 | 1.48749 | 70.2 | 0.530 | 26.18 | 57.739 |
| 37 | −67.823 | 5.00 | | | | 25.86 | |
| 38 | ∞ | 30.00 | 1.60342 | 38.0 | 0.579 | 36.00 | ∞ |
| 39 | ∞ | 16.20 | 1.51633 | 64.1 | 0.535 | 36.00 | ∞ |
| 40 | ∞ | | | | | 36.00 | |

| Various data Zoom ratio 19.50 | | | |
|---|---|---|---|
| | Wide angle | Intermediate | Telephoto |
| Focal length | 9.10 | 37.21 | 177.42 |
| F number | 1.85 | 1.85 | 2.73 |
| Angle of field | 31.15 | 8.41 | 1.78 |
| Image height | 5.50 | 5.50 | 5.50 |
| Total lens length | 255.80 | 255.80 | 255.80 |
| BF | 7.80 | 7.80 | 7.80 |
| d7 | 0.65 | 35.96 | 52.03 |
| d15 | 53.75 | 13.38 | 6.32 |
| d18 | 5.10 | 10.15 | 1.15 |
| d26 | 31.00 | 31.00 | 31.00 |
| d40 | 7.80 | 7.80 | 7.80 |

-continued

Unit: mm

| | | | |
|---|---|---|---|
| Entrance pupil position | 46.18 | 193.79 | 654.81 |
| Exit pupil position | 226.59 | 126.23 | 430.41 |
| Front principal point position | 55.66 | 242.69 | 906.72 |
| Rear principal point position | −1.30 | −29.41 | −169.62 |

Zoom lens unit data

| Unit | Leading surface | Focal length | Lens structure length | Front principal point position | Rear principal point position |
|---|---|---|---|---|---|
| 1 | 1 | 76.20 | 35.27 | 18.29 | −6.23 |
| 2 | 8 | −14.00 | 14.84 | 2.02 | −8.81 |
| 3 | 16 | −40.00 | 4.56 | 0.14 | −2.33 |
| 4 | 19 | 38.57 | 20.19 | 4.64 | −8.99 |
| 5 | 27 | 53.06 | 82.65 | 12.93 | −44.86 |

TABLE 5

Back focus variations per unit temperature variation of lens system ((dskd/dT)1)

| Surface number | dN/dT ($\times 10^{-6}$/° C.) | dskd/dN (Note 5) | (dskd/dT)1 (μm/° C.) |
|---|---|---|---|
| 16 | 6.4 | 0.042 | 0.538 |
| 17 | 1.8 | −0.016 | −0.057 |
| 20 | 5.4 | −0.032 | −0.349 |
| 22 | 1.5 | −0.017 | −0.050 |
| 24 | 2.6 | −0.065 | −0.334 |
| 25 | 1.6 | 0.036 | 0.118 |
| 27 | 2.6 | −0.045 | −0.233 |
| 29 | 5.0 | 0.049 | 0.494 |
| 30 | 2.7 | −0.059 | −0.318 |
| 32 | 2.7 | −0.042 | −0.226 |
| 33 | −159.1 | −0.009 | 2.822 |
| 34 | 5.0 | 0.035 | 0.354 |
| 36 | −0.8 | −0.034 | 0.055 |
| Sum | | | 2.812 |

(Note 5)
unit of dskd: mm, dN = 0.0005

TABLE 6

Back focus variations per unit temperature variation of lens barrel member ((dskd/dT)m)

| Surface number | Lens barrel member length (mm) | dskd/Δd (Note 6) | (dskd/dT)m (μm/° C.) |
|---|---|---|---|
| 15 | 51.591 | −0.021 | −0.255 |
| 18 | 4.951 | −0.187 | −0.221 |
| 19 | 2.669 | −0.187 | −0.119 |
| 21 | 4.434 | −0.022 | −0.024 |
| 23 | 2.108 | −0.002 | −0.001 |
| 26 | 33.049 | 0.000 | 0.000 |
| 28 | 3.169 | −0.084 | −0.064 |
| 31 | 3.225 | −0.016 | −0.012 |
| 35 | 2.258 | −0.005 | −0.003 |
| Sum | | | −0.698 |

(Note 6)
unit of dskd: mm, Δd = 0.1 mm

Fourth Embodiment

Figure 7:
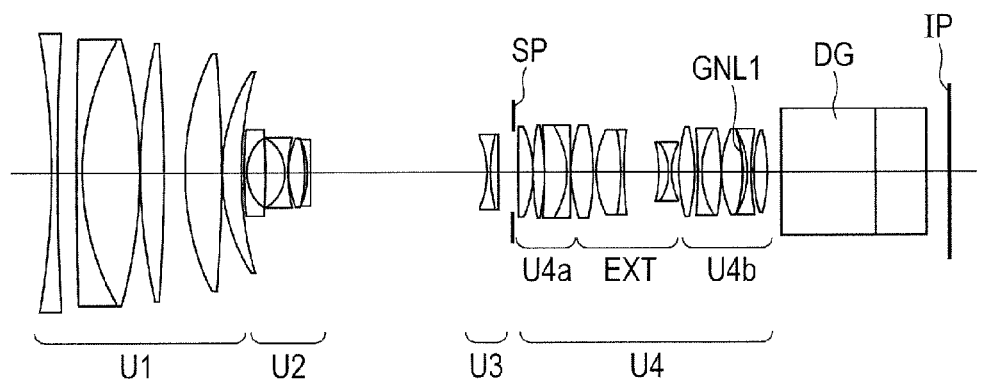
FIG. 7 is a cross-sectional view of a zoom lens at a wide-angle end in focus at infinity according to a fourth embodiment of the present invention.

FIG. 7 is a lens cross-sectional view when an object at infinity is focused at the wide-angle end of a zoom lens according to a fourth embodiment (Numerical Embodiment 4) of the present invention. The fourth embodiment describes an optical system having a doubled focal length by inserting a varying-magnification optical system EXT in an air interval between the 31st surface and the 32nd surface of the zoom lens according to the first embodiment.

In Numerical Embodiment 4 corresponding to the fourth embodiment, the refracting optical element GNL is made of an optical material shown in Table 9. In addition, the optical material is in a solid state when being used for the optical system, but may be in any state before being used for the optical system, for example, in the manufacturing process. For instance, in the manufacturing process, the optical material may be a liquid material or a solid-state material obtained by curing the liquid material. Note that, the optical material is sandwiched between the lenses, but the same effect for the chromatic aberration correction can be obtained even if the optical material is not sandwiched. In addition, as a matter of course, an optical material having a large value of dn/dT other than the optical material shown in Table 9 may be used for the refracting optical element GNL.

The third lens unit U3 includes one lens having positive refractive power and one lens having negative refractive power, and is constructed as a cemented lens in which the lens having negative refractive power and the lens having positive refractive power are arranged in an order from the object side and are cemented.

The first sub lens unit U4a includes three lenses having positive refractive power and one lens having negative refractive power, specifically, in an order from the object side, a biconvex positive lens, a biconvex positive lens, and a cemented lens in which a positive meniscus lens having a convex surface on the image side and a lens having negative refractive power are cemented.

The second sub lens unit U4b includes five lenses having positive refractive power and two lenses having negative refractive power, specifically, in an order from the object side, a lens having positive refractive power, a cemented lens in which a lens having negative refractive power and a lens having positive refractive power are cemented, a cemented lens in which a lens having positive refractive power, a lens having positive refractive power, and a lens having negative refractive power are cemented, and a lens having positive refractive power.

The varying-magnification optical system EXT is includes three lenses having positive refractive power and two lenses having negative refractive power, specifically, in an order from the object side, a biconvex positive lens, a cemented lens in which a lens having positive refractive power and a lens having negative refractive power are cemented, and a cemented lens in which a lens having positive refractive power and a lens having negative refractive power are cemented.

Table 10 shows corresponding values of each conditional expression according to the fourth embodiment. The fourth embodiment has a feature that the values are close to the lower limit values of the conditional expressions (13), (14), (15), (17), (19), (22), and (26), and close to the upper limit values of the conditional expressions (20) and (24).

Table 7 shows surface numbers and corresponding values of dn/dT, dskd/dN, and (dskd/dT)l of the back focus variation per unit temperature variation of the lens system according to Numerical Embodiment 4. As shown in Table 7, the sum of the value (dskd/dT)l of the back focus variation amount per unit temperature variation of the lens system is 5.506 µm/° C.

Table 8 shows the surface numbers and corresponding values of the length of the lens barrel member for maintaining space between lenses, dskd/Ad, and the value (dskd/dT)m of the back focus variation amount per unit temperature variation of the lens barrel member according to Numerical Embodiment 4. As shown in Table 8, the sum of the value (dskd/dT)m of the back focus variation amounts per unit temperature variation of the lens barrel member is −3.754 µm/° C. In the fourth embodiment, an aluminum member having a linear expansion coefficient $\alpha_i$ of $23 \times 10^{-6}$ (° C.$^{-1}$) is used for the lens barrel member.

Table 11 shows values of the focal depth at the wide-angle end, the back focus variation amounts per unit temperature variation of the lens system, the lens barrel member, and the entire system, and the back focus variation amount due to ambient temperature variation of ±8° C. according to the fourth embodiment. The values of the back focus variation amounts per unit temperature variation of the lens system and the lens barrel member shown in the field for the fourth embodiment in Table 11 are the sum of (dskd/dT)l shown in Table 7 and the sum of (dskd/dT)m shown in Table 8, respectively. The value of the back focus variation amount per unit temperature variation of the entire system shown in the field for the fourth embodiment in Table 11 is the sum of (dskd/dT)l shown in Table 7 plus the sum of (dskd/dT)m shown in Table 8.

In the fourth embodiment, when the refractive power and dn/dT of each lens, and the linear expansion coefficient of the lens barrel member for maintaining the space between lenses are defined, the value (dskd/dT)t of the back focus variation amount per unit temperature variation of the entire system is 1.752 µm/° C. as shown in Table 11. Therefore, the back focus variation amount due to the ambient temperature variation of ±8° C. of the entire system also falls within the focal depth. In addition, a difference between the back focus variation amounts per unit temperature variation of the entire system in the first and fourth embodiments in Table 11 indicates a shift amount of the value (dskd/dT)t of the back focus variation amount per unit temperature variation of 2× with respect to that of 1×, which is a very small value of −0.147 µm/° C.

Figure 8A:
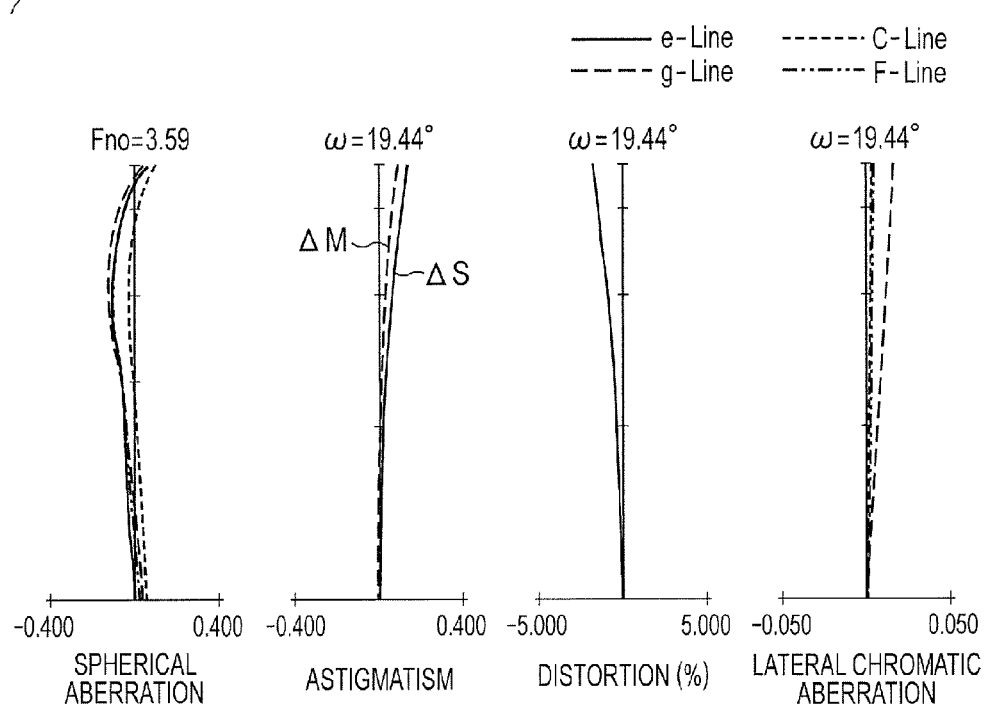
FIG. 8A is a longitudinal aberration diagram at the wide-angle end when the object distance is 2.5 m according to Numerical Embodiment 4.
Figure 8B:
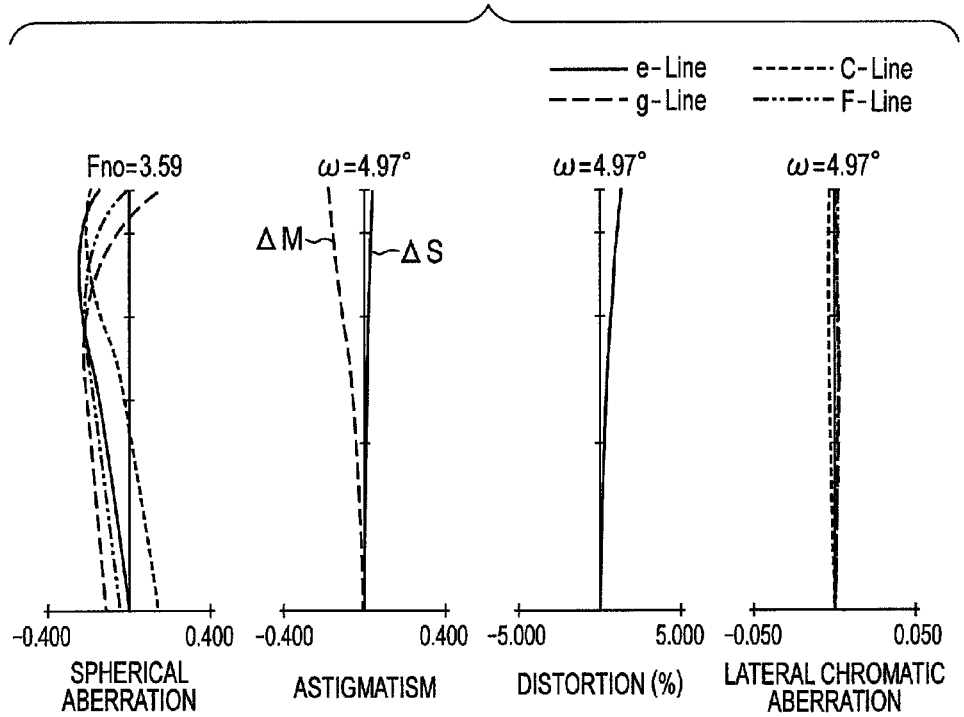
FIG. 8B is a longitudinal aberration diagram at a focal length of 63.25 mm when the object distance is 2.5 m according to Numerical Embodiment 4.
Figure 8C:
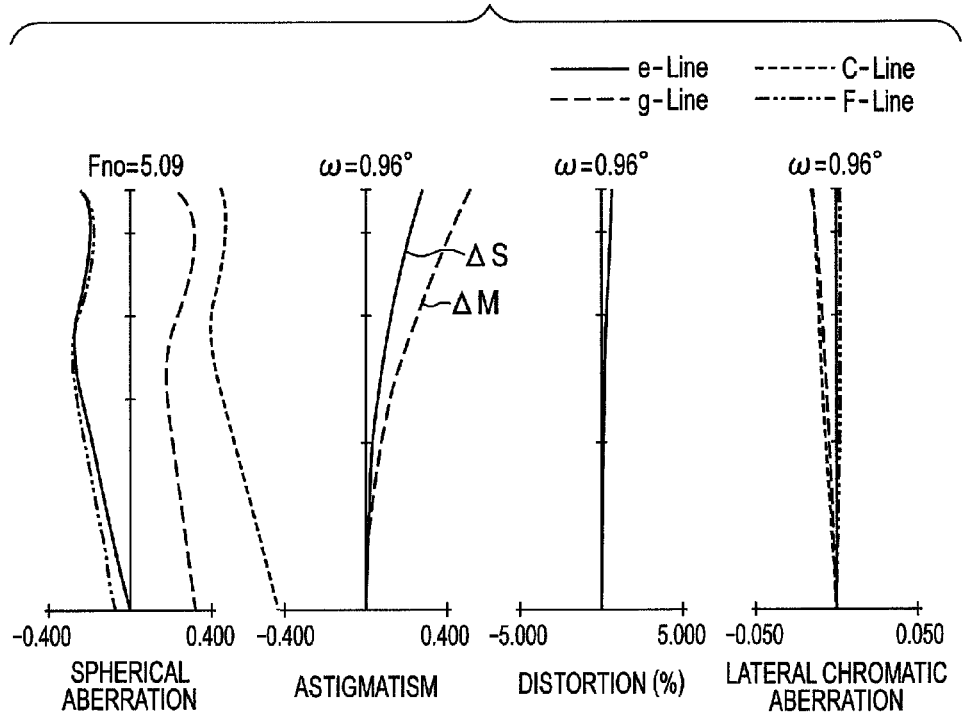
FIG. 8C is a longitudinal aberration diagram at the telephoto end when the object distance is 2.5 m according to Numerical Embodiment 4.

FIGS. 8A, 8B, and 8C are longitudinal aberration diagrams when an object at a distance of 2.5 m is focused at the wide-angle end, at a focal length of 63.25 mm, and at the telephoto end, respectively, in which the varying-magnification optical system is inserted into the fourth lens unit U4, according to Numerical Embodiment 4. Here, the value of the object distance corresponds a distance from a first surface in the first lens unit U1.

In the aberration diagrams, the spherical aberrations are illustrated by the e-line, the g-line, the C-line, and the F-line. The astigmatisms are illustrated by a meridional image plane (ΔM) on the e-line and a sagittal image plane (ΔS) on the e-line. The lateral chromatic aberrations are illustrated by the g-line, the C-line, and the F-line. "Fno" represents an F number, and "ω" represents a half angle of field. In addition, in the aberration diagrams, the spherical aberrations are illustrated in a scale of 0.4 mm, the astigmatisms are illustrated in a scale of 0.4 mm, the distortions are illustrated in a scale of 5%, and the lateral chromatic aberrations are illustrated in a scale of 0.05 mm.

Note that, the wide-angle end and the telephoto end refer to zoom positions when the second lens unit U2 during varying magnification is positioned at respective ends of its mechanically movable range on the optical axis.

In Numerical Embodiment 4 described below, a surface number "i" is an ordinal of the surface counted from the object side. In addition, "$r_i$" represents a curvature radius of an i-th surface counted from the object side, and "$d_i$" represents an interval between the i-th surface and an (i+1)-th surface which are counted from the object side. Further, "$N_i$" and "$\nu_i$" represent a refractive index and an Abbe number of an i-th optical material, respectively.

Last three surfaces correspond to a glass block such as a filter.

The mark "*" represents an aspherical surface.

Numerical Embodiment 4

| | | | | | | | |
|---|---|---|---|---|---|---|---|
| | | | Unit: mm | | | | |
| Surface number | r | d | nd | vd | θgF | Effective diameter | Focal length |
| 1 | −274.646 | 1.80 | 1.72915 | 54.6 | 0.544 | 90.92 | −287.02 |
| 2 | 898.230 | 6.00 | | | | 87.85 | |
| 3 | 1914.258 | 1.80 | 1.80000 | 29.8 | 0.601 | 86.49 | −127.12 |
| 4 | 97.254 | 18.26 | 1.43875 | 94.9 | 0.534 | 84.98 | 142.69 |
| 5 | −166.824 | 0.15 | | | | 85.20 | |
| 6 | 200.643 | 7.37 | 1.59240 | 68.3 | 0.545 | 83.93 | 255.27 |
| 7 | −614.175 | 6.90 | | | | 83.57 | |
| 8 | 92.506 | 12.12 | 1.49699 | 81.5 | 0.537 | 78.53 | 152.78 |
| 9 | −412.049 | 0.14 | | | | 77.57 | |
| 10 | 66.953 | 5.97 | 1.72915 | 54.6 | 0.544 | 65.97 | 169.59 |
| 11 | 139.779 | (Variable) | | | | 64.95 | |
| 12* | 310.286 | 0.70 | 1.88299 | 40.7 | 0.566 | 27.75 | −17.06 |
| 13 | 14.434 | 6.18 | | | | 21.85 | |
| 14 | −121.452 | 6.35 | 1.80809 | 22.7 | 0.630 | 21.61 | 18.27 |
| 15 | −13.601 | 0.70 | 1.81600 | 46.6 | 0.556 | 21.43 | −12.80 |
| 16 | 47.190 | 0.29 | | | | 20.69 | |
| 17 | 24.757 | 6.05 | 1.53171 | 48.8 | 0.563 | 20.96 | 24.66 |
| 18 | −25.774 | 0.46 | | | | 20.64 | |
| 19 | −26.110 | 0.70 | 1.83480 | 42.7 | 0.564 | 20.04 | −34.56 |
| 20 | −263.828 | (Variable) | | | | 19.93 | |
| 21 | −28.945 | 1.00 | 1.74319 | 49.3 | 0.553 | 21.21 | −23.61 |
| 22 | 45.798 | 2.57 | 1.84666 | 23.7 | 0.620 | 23.38 | 53.46 |
| 23 | −24563.343 | (Variable) | | | | 23.82 | |
| 24 (Stop) | ∞ | 1.30 | | | | 27.75 | |
| 25 | 930.116 | 4.65 | 1.72342 | 37.9 | 0.583 | 28.89 | 55.30 |
| 26 | −41.990 | 0.15 | | | | 29.68 | |
| 27 | 108.501 | 3.44 | 1.73799 | 32.2 | 0.589 | 30.48 | 66.24 |
| 28 | −88.950 | 0.15 | | | | 30.47 | |
| 29 | −244.718 | 7.77 | 1.58913 | 61.1 | 0.540 | 30.19 | 51.11 |
| 30 | −27.222 | 1.00 | 1.80518 | 25.4 | 0.616 | 29.72 | −37.46 |
| 31 | −261.151 | 0.19 | | | | 29.97 | |
| 32 | 48.052 | 7.01 | 1.48749 | 70.2 | 0.530 | 30.24 | 58.70 |
| 33 | −67.946 | 0.68 | | | | 29.79 | |
| 34 | 32.639 | 8.08 | 1.43875 | 94.9 | 0.534 | 27.28 | 54.45 |
| 35 | −83.208 | 0.90 | 1.80518 | 25.4 | 0.616 | 24.76 | −51.66 |
| 36 | 85.163 | 11.45 | | | | 23.70 | |
| 37 | −50.687 | 3.22 | 1.92286 | 18.9 | 0.649 | 18.84 | 32.23 |
| 38 | −19.473 | 0.70 | 1.67300 | 38.1 | 0.575 | 18.73 | −14.73 |
| 39 | 20.760 | 2.50 | | | | 17.48 | |
| 40 | 61.980 | 5.16 | 1.58913 | 61.1 | 0.540 | 29.97 | 50.09 |
| 41 | −54.999 | 1.03 | | | | 29.74 | |
| 42 | −141.885 | 1.00 | 1.88299 | 40.7 | 0.566 | 28.10 | −28.21 |
| 43 | 30.537 | 6.34 | 1.51633 | 64.1 | 0.535 | 27.03 | 42.43 |
| 44 | −72.997 | 0.20 | | | | 27.18 | |
| 45 | 38.761 | 6.57 | 1.51633 | 64.1 | 0.535 | 26.86 | 42.09 |
| 46 | −47.000 | 1.60 | 1.63555 | 22.7 | 0.689 | 26.17 | 119.14 |
| 47 | −29.500 | 1.00 | 1.88299 | 40.7 | 0.566 | 26.07 | −23.89 |
| 48 | 76.815 | 0.65 | | | | 25.73 | |

-continued

Unit: mm

| | | | | | | | |
|---|---|---|---|---|---|---|---|
| 49 | 42.341 | 4.30 | 1.51633 | 64.1 | 0.535 | 26.02 | 51.07 |
| 50 | −68.157 | 4.50 | | | | 25.91 | |
| 51 | ∞ | 30.00 | 1.60342 | 38.0 | 0.579 | 40.00 | ∞ |
| 52 | ∞ | 16.20 | 1.51633 | 64.1 | 0.535 | 40.00 | ∞ |
| 53 | ∞ | | | | | 40.00 | |

Aspherical surface data
Twelfth surface

K = −1.89592e+002    A4 = 8.34507e−006    A6 = −6.71463e−008
A8 = 3.07779e−010    A10 = −9.69366e−013    A12 = 8.68049e−015
A3 = 1.53937e−006    A5 = 3.41602e−007    A7 = −6.02014e−010
A9 = 1.58086e−011    A11 = −1.70884e−013

Various data
Zoom ratio 21.00

| | Wide angle | Intermediate | Telephoto |
|---|---|---|---|
| Focal length | 15.58 | 63.25 | 327.17 |
| F number | 3.59 | 3.59 | 5.09 |
| Angle of field | 19.44 | 4.97 | 0.96 |
| Image height | 5.50 | 5.50 | 5.50 |
| Total lens length | 286.08 | 286.08 | 286.08 |
| BF | 7.50 | 7.50 | 7.50 |
| d11 | 0.67 | 36.74 | 53.38 |
| d20 | 55.71 | 13.97 | 5.33 |
| d23 | 4.85 | 10.52 | 2.52 |
| d39 | 2.50 | 2.50 | 2.50 |
| d53 | 7.50 | 7.50 | 7.50 |
| Entrance pupil position | 55.70 | 192.43 | 673.35 |
| Exit pupil position | −98.60 | −98.60 | −98.60 |
| Front principal point position | 68.99 | 217.97 | −8.26 |
| Rear principal point position | −8.08 | −55.75 | −319.66 |

Zoom lens unit data

| Unit | Leading surface | Focal length | Lens structure length | Front principal point position | Rear principal point position |
|---|---|---|---|---|---|
| 1 | 1 | 70.90 | 60.54 | 38.19 | −0.29 |
| 2 | 12 | −13.06 | 21.46 | 1.97 | −12.21 |
| 3 | 21 | −42.80 | 3.58 | −0.06 | −2.02 |
| 4 | 24 | 19.45 | 50.72 | −15.90 | −24.87 |
| 5 | 40 | 52.60 | 78.55 | 7.69 | −45.96 |

TABLE 7

Back focus variation per unit
temperature variation of lens system((dskd/dT)1)

| Surface number | dN/dT ($\times 10^{-6}/°C.$) | dskd/dN (Note 7) | (dskd/dT)1 ($\mu m/°C.$) |
|---|---|---|---|
| 21 | 6.4 | 0.174 | 2.245 |
| 22 | 1.8 | −0.066 | −0.238 |
| 25 | 5.4 | −0.136 | −1.481 |
| 27 | 5.8 | −0.118 | −1.364 |
| 29 | 3.7 | −0.176 | −1.302 |
| 30 | 1.6 | 0.180 | 0.587 |
| 32 | −0.8 | −0.184 | 0.295 |
| 34 | −6.7 | −0.167 | 2.243 |
| 35 | 1.6 | 0.077 | 0.250 |
| 37 | 2.5 | −0.044 | −0.216 |
| 38 | 4.2 | 0.144 | 1.209 |
| 40 | 3.7 | −0.047 | −0.348 |
| 42 | 5.0 | 0.051 | 0.509 |
| 43 | 2.7 | −0.058 | −0.315 |
| 45 | 2.7 | −0.051 | −0.276 |

TABLE 7-continued

Back focus variation per unit
temperature variation of lens system((dskd/dT)1)

| Surface number | dN/dT ($\times 10^{-6}/°C.$) | dskd/dN (Note 7) | (dskd/dT)1 ($\mu m/°C.$) |
|---|---|---|---|
| 46 | −159.1 | −0.011 | 3.442 |
| 47 | 5.0 | 0.045 | 0.451 |
| 49 | 2.7 | −0.034 | −0.185 |
| Sum | | | 5.506 |

(Note 7)
unit of dskd: mm, dN = 0.0005

TABLE 8

Back focus variations per unit
temperature variation of lens barrel member ((dskd/dT)m)

| Surface number | Lens barrel member length (mm) | dskd/Δd (Note 8) | (dskd/dT)m ($\mu m/°C.$) |
|---|---|---|---|
| 20 | 53.881 | −0.085 | −1.096 |
| 23 | 4.849 | −0.741 | −0.859 |
| 24 | 1.412 | −0.741 | −0.250 |
| 26 | 3.935 | −0.064 | −0.060 |
| 28 | 0.998 | −0.069 | −0.016 |
| 31 | 3.070 | 0.000 | 0.000 |
| 33 | 5.328 | −0.333 | −0.425 |
| 36 | 9.742 | −0.413 | −0.962 |
| 39 | 2.410 | 0.000 | 0.000 |
| 41 | 2.381 | −0.110 | −0.063 |
| 44 | 3.879 | −0.023 | −0.021 |
| 48 | 1.613 | −0.002 | −0.001 |
| Sum | | | −3.754 |

(Note 8)
unit of dskd: mm, Δd = 0.1 mm

TABLE 9

Optical constants of optical material

| | Optical material |
|---|---|
| d-line refractive index | 1.63555 |
| g-line refractive index | 1.67532 |
| C-line refractive index | 1.62807 |
| F-line refractive index | 1.65604 |
| νd | 22.7 |
| θgd | 1.422 |
| θgF | 0.689 |

TABLE 10

Conditional expressions according to Numerical Embodiments 1 to 4

| | Numerical Embodiment 1 | Numerical Embodiment 2 | Numerical Embodiment 3 | Numerical Embodiment 4 |
|---|---|---|---|---|
| Conditional Expression (5) | 0.525 | 0.526 | 0.665 | — |
| Conditional Expression (7) | 0.689 | 0.689 | 0.689 | 0.689 |
| Conditional Expression (9) | 1.422 | 1.422 | 1.422 | 1.422 |
| Conditional Expression (10) | 0.065 | 0.049 | 0.057 | — |
| Conditional Expression (13) | 2.465.E−05 | 1.639.E−05 | 1.748.E−05 | 2.465.E−05 |
| Conditional Expression (14) | −3.181.E−05 | −3.648.E−05 | −3.365.E−05 | −3.181.E−05 |
| Conditional Expression (15) | 1.126.E−05 | 7.239.E−06 | 6.869.E−06 | 1.126.E−05 |
| Conditional Expression (16) | −9.502.E−06 | −1.177.E−05 | −8.222.E−06 | −9.502.E−06 |
| Conditional Expression (17) | 1.339.E−05 | 4.287.E−06 | 7.987.E−06 | 1.339.E−05 |
| Conditional Expression (18) | −2.046.E−05 | −2.135.E−05 | −1.772.E−05 | −2.046.E−05 |
| Conditional Expression (19) | 4.569 | 4.020 | 4.195 | 4.569 |
| Conditional Expression (20) | −4.066 | −3.385 | −3.521 | −4.066 |
| Conditional Expression (22) | 4.569 | 2.179 | 3.276 | 4.569 |
| Conditional Expression (24) | −4.066 | −0.728 | −3.521 | −4.066 |
| Conditional Expression (26) | — | — | — | 2.006 |
| Conditional Expression (27) | 0.000 | 0.000 | 0.000 | — |
| Conditional Expression (28) | 1.175 | 1.714 | 1.034 | 1.175 |

TABLE 11

Focal depth at wide-angle end, back focus variation amounts per unit temperature variation, and back focus variation amounts due to ambient temperature variation of ±8° C. according to Numerical Embodiments 1 to 4

| | | Numerical Embodiment | | | |
|---|---|---|---|---|---|
| | | 1 | 2 | 3 | 4 |
| Focal depth at wide-angle end (μm) (Note 9) | — | ±18.000 | ±18.000 | ±18.500 | ±35.900 |
| Back focus variations per unit temperature variation (μm/° C.) | Lens system | 2.561 | 2.780 | 2.812 | 5.506 |
| | Lens barrel member | −0.662 | −0.656 | −0.698 | −3.754 |
| | Entire system | 1.899 | 2.124 | 2.114 | 1.752 |
| Back focus variations due to ambient temperature variation of ±8° C. (μm) | Entire system | ±15.192 | ±16.992 | ±16.912 | ±14.016 |

(Note 9)
value when permissible circle of confusion has diameter of 0.010 mm

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-147073, filed Jul. 1, 2011, which is hereby incorporated by reference herein in its entirety.

What is claimed is:
1. A zoom lens, comprising, in an order from an object side:
a first lens unit having positive refractive power which does not move for varying magnification;

a second lens unit having negative refractive power which moves in an optical axis direction during varying magnification;

a third lens unit which moves in the optical axis direction during varying magnification; and a fourth lens unit having positive refractive power which does not move for varying magnification, wherein:

the fourth lens unit comprises, in an order from the object side, a first sub lens unit having positive refractive power, and a second sub lens unit having positive refractive power;

the first sub lens unit and the second sub lens unit are separated by a largest air interval in the fourth lens unit;

the second sub lens unit comprises at least one refracting optical element having positive refractive power;

the following conditions are satisfied:

$$-2.100 \times 10^{-3} \times vdm + 0.693 < \theta gFm; \text{ and}$$

$$0.555 < \theta gFm < 0.900,$$

where "$\theta gFm$" and "$vdm$" represent a partial dispersion ratio and an Abbe constant of the refracting optical element, respectively, provided that:

$$vdm = (Nd-1)/(NF-NC); \text{ and}$$

$$\theta gFm = (Ng-NF)/(NF-NC),$$

where "$Ng$", "$NF$", "$Nd$", and "$NC$" represent refractive indices for a g-line, an F-line, a d-line, and a C-line, respectively; and the third lens unit, the first sub lens unit, and the second sub lens unit each satisfy the following conditions for lenses except the refracting optical element having positive refractive power included in the second sub lens unit:

$$1.5 \times 10^{-5} < \Sigma_{i,j}(\phi p_{ij} \times (dn/dT)p_{ij})/\Sigma_i \phi_i < 3.0 \times 10^{-5}$$

(i=3, 4a, 4b) (j=1, 2, ..., $Sp_i$); and $$-4.0 \times 10^{-5} < \Sigma_{i,j}(\phi n_{ij} \times (dn/dT)n_{ij})/\Sigma_i \phi_i < -2.5 \times 10^{-5}$$

(i=3, 4a, 4b) (j=1, 2, ..., $Sn_i$), where "$\phi p_{ij}$" represents refractive power of a j-th lens having positive refractive power from the object side in an i-th lens unit, "$\phi n_{ij}$" represents refractive power of a j-th lens having negative refractive power from the object side in the i-th lens unit, "$\phi_i$" represents refractive power of the i-th lens unit, "$(dn/dT)p_{ij}$" represents a coefficient of refractive index variation due to temperature variation (an average value in a range of −20° C. to 40° C.) in air on an e-line of the j-th lens having positive refractive power other than the refracting optical element among lenses having positive refractive power from the object side in the i-th lens unit, "$(dn/dT)n_{ij}$" represents a coefficient of refractive index variation due to temperature variation (an average value in a range of −20° C. to 40° C.) in the air on the e-line of the j-th lens having negative refractive power from the object side in the i-th lens unit, "$Sp_i$" represents a number of lenses having positive refractive power in the i-th lens unit other than the refracting optical element, and "$Sn_i$" represents a number of lenses having negative refractive power in the i-th lens unit.

2. A zoom lens according to claim 1, wherein the first sub lens unit and the second sub lens unit each satisfy the following conditions:

$$0.5 \times 10^{-5} < \Sigma_{i,j}(\phi p_{ij} \times (dn/dT)p_{ij})/\Sigma_i \phi_i < 1.5 \times 10^{-5}$$

(i=4a, 4b) (j=1, 2, ..., $Sp_i$); and $$-1.3 \times 10^{-5} < \Sigma_{i,j}(\phi n_{ij} \times (dn/dT)n_{ij})/\Sigma_i \phi_i < -0.5 \times 10^{-5}$$

(i=4a, 4b) (j=1, 2, ..., $Sn_i$).

3. A zoom lens according to claim 1, wherein the second sub lens unit satisfies the following conditions:

$$0.4 \times 10^{-5} < \Sigma_{i,j}(\phi p_{ij} \times (dn/dT)p_{ij})/\Sigma_i \phi_i < 1.5 \times 10^{-5}$$

(i=4b) (j=1, 2, ..., $Sp_i$); and $$-2.5 \times 10^{-5} < \Sigma_{i,j}(\phi n_{ij} \times (dn/dT)n_{ij})/\Sigma_i \phi_i < -1.5 \times 10^{-5}$$

(i=4b) (j=1, 2, ..., $Sn_i$).

4. A zoom lens according to claim 1, wherein the second sub lens unit satisfies the following conditions:

$$3.6 < \Sigma_j(\phi p 4b_j)/\phi 4b < 5.3$$

(j=1, 2, ..., $Sp_i$); and $$-4.5 < \Sigma_j(\phi n 4b_j)/\phi 4b < -3.0$$

(j=1, 2, ..., $Sn_i$).

5. A zoom lens according to claim 1, wherein the following condition is satisfied:

$$1.5 < \Sigma_j(\phi p 4b_{j\_r}/\phi 4b) < 6.0 \ (j=1, 2, ..., Sp_i),$$

where "$\phi p4b_{j\_r}$" represents refractive power of a j-th lens from the object side having positive refractive power among lenses having positive refractive power in the second sub lens unit, the lens having positive refractive power being made of glass satisfying the following condition:

$$50 < vdp4b < 70,$$

where "$vdp4b$" represents an Abbe constant.

6. A zoom lens according to claim 1, wherein the following condition is satisfied:

$$-5.0 < \Sigma_j(\phi n 4b_{j\_r}/\phi 4b) < -0.5 \ (j=1, 2, ..., Sn_j),$$

where "$\phi n4b_{j\_r}$" represents refractive power of a j-th lens from the object side having negative refractive power among lenses having negative refractive power in the second sub lens unit, the lens having negative refractive power being made of glass satisfying the following condition:

$$0.6406 - 1.7735 \times 10^{-3} \times vdn4b > \theta gFn4b,$$

where "$vdn4b$" and "$\theta gFn4b$" represent an Abbe constant and a partial dispersion ratio, respectively.

7. A zoom lens according to claim 1, wherein:

the fourth lens unit comprises a varying-magnification optical system insertable into and removable from an optical path between the first sub lens unit and the second sub lens unit; and the fourth lens unit satisfies the following condition:

$$0.7 < h\_k/h\_k+1 < 2.5,$$

where "$h\_k$" represents a height from an optical axis of an axial ray entering a first lens surface of the varying-magnification optical system, and "$h\_k+1$" represents a height from the optical axis of an axial ray exiting from a final lens surface of the varying-magnification optical system.

8. An image pickup apparatus, comprising:

a camera; and a zoom lens;

wherein the zoom lens includes, in an order from an object side:

a first lens unit having positive refractive power which does not move for varying magnification;

a second lens unit having negative refractive power which moves in an optical axis direction during varying magnification;

a third lens unit which moves in the optical axis direction during varying magnification; and
a fourth lens unit having positive refractive power which does not move for varying magnification, wherein:
the fourth lens unit comprises, in an order from the object side, a first sub lens unit having positive refractive power, and a second sub lens unit having positive refractive power;
the first sub lens unit and the second sub lens unit are separated by a largest air interval in the fourth lens unit;
the second sub lens unit comprises at least one refracting optical element having positive refractive power;
the following conditions are satisfied:

$$-2.100 \times 10^{-3} \times vdm + 0.693 < \theta gFm;\ \text{and}$$

$$0.555 < \theta gFm < 0.900,$$

where "$\theta gFm$" and "$vdm$" represent a partial dispersion ratio and an Abbe constant of the refracting optical element, respectively, provided that:

$$vdm = (Nd-1)/(NF-NC);\ \text{and}$$

$$\theta gFm = (Ng-NF)/(NF-NC),$$

where "Ng", "NF", "Nd", and "NC" represent refractive indices for a g-line, an F-line, a d-line, and a C-line, respectively; and
the third lens unit, the first sub lens unit, and the second sub lens unit each satisfy the following conditions for lenses except the refracting optical element having positive refractive power included in the second sub lens unit:

$$1.5 \times 10^{-5} < \Sigma_{i,j}(\phi p_{ij} \times (dn/dT)p_{ij})/\Sigma_i \phi_i < 3.0 \times 10^{-5}$$

$(i=3, 4a, 4b)\ (j=1, 2, \ldots, Sp_i);\ \text{and}$ $$-4.0 \times 10^{-5} < \Sigma_{i,j}(\phi n_{ij} \times (dn/dT)n_{ij})/\Sigma_i \phi_i < -2.5 \times 10^{-5}$$

$(i=3, 4a, 4b)\ (j=1, 2, \ldots, Sn_i),$ where "$\phi p_{ij}$" represents refractive power of a j-th lens having positive refractive power from the object side in an i-th lens unit, "$\phi n_{ij}$" represents refractive power of a j-th lens having negative refractive power from the object side in the i-th lens unit, "$\phi_i$" represents refractive power of the i-th lens unit, "$(dn/dT)p_{ij}$" represents a coefficient of refractive index variation due to temperature variation (an average value in a range of $-20°$ C. to $40°$ C.) in air on an e-line of the j-th lens having positive refractive power other than the refracting optical element among lenses having positive refractive power from the object side in the i-th lens unit "$(dn/dT)n_{ij}$" represents a coefficient of refractive index variation due to temperature variation (an average value in a range of $-20°$ C. to $40°$ C.) in the air on the e-line of the i-th lens having negative refractive power from the object side in the i-th lens unit "$Sp_i$" represents a number of lenses having positive refractive power in the i-th lens unit other than the refracting optical element, and "$Sn_i$" represents a number of lenses having negative refractive power in the i-th lens unit.

* * * * *